United States Patent
Itaya et al.

(10) Patent No.: US 8,041,377 B2
(45) Date of Patent: Oct. 18, 2011

(54) RADIO DEVICE FOR PREVENTING ISOLATED RADIO DEVICES IN NETWORK

(75) Inventors: Satoko Itaya, Kyoto (JP); Jun Hasegawa, Kyoto (JP); Akio Hasegawa, Kyoto (JP); Peter Davis, Kyoto (JP); Tetsuya Ito, Tokyo (JP); Akira Matsumoto, Tokyo (JP); Naoto Kadowaki, Kyoto (JP); Sadao Obana, Kyoto (JP)

(73) Assignees: NEC Communication Systems Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 709 days.

(21) Appl. No.: 11/905,006

(22) Filed: Sep. 27, 2007

(65) Prior Publication Data

US 2008/0076461 A1  Mar. 27, 2008

(30) Foreign Application Priority Data

Sep. 27, 2006  (JP) .................................. 2006-262579

(51) Int. Cl.
*H04B 7/00* (2006.01)
(52) U.S. Cl. ......... 455/519; 455/512; 455/513; 455/445
(58) Field of Classification Search .................. 455/519, 455/445, 518, 512, 513
See application file for complete search history.

(56) References Cited

U.S. PATENT DOCUMENTS

2004/0121792 A1* 6/2004 Allen et al. ................... 455/519
2005/0197127 A1  9/2005 Nakasaku et al.
2006/0205424 A1* 9/2006 Dupcinov et al. ............. 455/513
2008/0125069 A1  5/2008 Davis et al.

FOREIGN PATENT DOCUMENTS

| JP | 2003-115858 | 4/2003 |
| JP | 2005-236632 | 9/2005 |
| JP | 2005-252781 | 9/2005 |
| JP | 2005-323266 | 11/2005 |
| JP | 2006-505186 | 2/2006 |

(Continued)

OTHER PUBLICATIONS

Watanabe, M., "Wireless Ad hoc Network", Annual Spring Congresses in Yokohama Humantronics Forum, May 2003, pp. 18-23, Society of Automotive Engineers of Japan.

(Continued)

*Primary Examiner* — Edward Urban
*Assistant Examiner* — Golam Sorowar
(74) *Attorney, Agent, or Firm* — McDermott Will & Emery LLP

(57) ABSTRACT

A radio device is located far from other radio devices in a radio network system. The radio device determines a threshold WIth for detecting a strength equal to or more than the minimum strength of radio waves transmitted/received in a stable radio wave environment based on a plurality of reception signal strengths of Hello packets received from radio devices adjacent to the radio device. Then, if the number of radio devices adjacent to the radio device when the threshold WIth is introduced is less than a standard value (such as five), the radio device stores the adjacent radio devices in the neighbor list without introducing the threshold WIth, and then, maintains in the routing table the routing information of routes passing through the adjacent radio devices based on the neighbor list.

10 Claims, 24 Drawing Sheets

FOREIGN PATENT DOCUMENTS

| | | |
|---|---|---|
| JP | 2006-81163 | 3/2006 |
| JP | 2006-086782 | 3/2006 |
| WO | WO 2004/040863 A1 | 5/2004 |

OTHER PUBLICATIONS

Pei, G., et al., "Fisheye State Routing: A Routing Scheme for Ad Hoc Wireless Networks", ICC 2000 Communications, Jun. 2000, pp. 70-74, vol. 1.

Dube, R., et al., "Signal Stability-Based Adaptive Routing (SSA) for Ad Hoc Mobile Networks", IEEE Personal Communications, Feb. 1997, pp. 36-45.

Satoko Itaya, et al., "Proposal and experiment of stabilization methods on large ad hoc wireless networks," IPSJ SIG Technical Reports, IPSJ, Nov. 17-18, 2005, vol. 2005, No. 113, pp. 17-22.

Hasegawa, Jun, et al., "Performance evaluation of ad-hoc routing in an office environment," IPSJ SIG Technical Reports, IPSJ, May 13-14, 2004, vol. 2004, No. 44, pp. 71-74.

Oba, Makoto, et al., "A Link Quality-based Routing Protocol for Wireless Ad Hoc Networks," IEICE Technical Report, The Institute of Electronics, Information and Communication Engineers, Apr. 14, 2005, vol. 105, No. 16, pp. 7-12.

Japanese Notification of Reasons for Refusal, w/ English translation thereof, issued in Japanese Patent Application No. JP 2006-262579 dated on Sep. 30, 2008.

U.S. Appl. No. 11/887,188, filed Sep. 26, 2007.

United States Office Action issued in U.S. Appl. No. 11/887,188, dated May 10, 2010.

U.S. Office Action issued in U.S. Appl. No. 11/887,188, mailed Jan. 31, 2011.

\* cited by examiner

Fig. 3

| Version (Version) | IHL (Header Length) | Type of Service (Type of Service) | Total Length (Packet Length) | |
|---|---|---|---|---|
| Identification (Identification Number) | | | Flags (Flags) | Fragment Offset (Fragment Offset) |
| Time to Live (Time to Live) | | Protocol (Protocol) | Header Checksum (Header Checksum) | |
| Source Address (Source Address) | | | | |
| Destination Address (Destination Address) | | | | |
| Options (Options) | | | | |

BIT 0 — BIT 8 — BIT 16 — BIT 24 — BIT 31

| DESTINATION | NEXT RADIO DEVICE | HOP NUMBER | FLAG |
|---|---|---|---|
| ..... | ..... | ..... | ..... |
| ..... | ..... | ..... | ..... |
| ⋮ | ⋮ | ⋮ | ⋮ |

NEIGHBOR LIST OF RADIO DEVICE 36  10

| index | ADJACENT RADIO DEVICES |
|---|---|
| 1 | 32 |
| 2 | 35 |
| 3 | 37 |
| 4 | 38 |
| 5 | 39 |
| 6 | 41 |

⇩

NEIGHBOR LIST OF RADIO DEVICE 36  10A

| index | ADJACENT RADIO DEVICES |
|---|---|
| 1 | 32 |
| 2 | 35 |
| 4 | 38 |
| 5 | 39 |
| 6 | 41 |

Fig. 12

NEIGHBOR LIST OF RADIO DEVICE 32  10B

| index | ADJACENT RADIO DEVICES |
|---|---|
| 1 | 31 |
| 2 | 35 |
| 3 | 36 |

(a)

NEIGHBOR LIST OF RADIO DEVICE 35  10C

| index | ADJACENT RADIO DEVICES |
|---|---|
| 1 | 32 |
| 2 | 33 |
| 3 | 38 |
| 4 | 36 |

(b)

NEIGHBOR LIST OF RADIO DEVICE 38  10D

| index | ADJACENT RADIO DEVICES |
|---|---|
| 1 | 35 |
| 2 | 34 |
| 3 | 40 |
| 4 | 39 |
| 5 | 36 |

(c)

NEIGHBOR LIST OF RADIO DEVICE 37  10E

| index | ADJACENT RADIO DEVICES |
|---|---|
| 1 | 31 |
| 2 | 36 |
| 3 | 41 |

NEIGHBOR LIST OF RADIO DEVICE 39  10F

| index | ADJACENT RADIO DEVICES |
|---|---|
| 1 | 36 |
| 2 | 38 |
| 3 | 40 |
| 4 | 42 |
| 5 | 41 |

(a)

NEIGHBOR LIST OF RADIO DEVICE 41  10G

| index | ADJACENT RADIO DEVICES |
|---|---|
| 1 | 37 |
| 2 | 36 |
| 3 | 39 |
| 4 | 42 |
| 5 | 43 |

(b)

21A

| DESTINATION | NEXT RADIO DEVICES | HOP NUMBER | FLAG |
|---|---|---|---|
| 40 | 39 | 2 | 0 |
| 42 | 39 | 2 | 0 |
| 43 | 41 | 2 | 0 |

NEIGHBOR LIST OF RADIO DEVICE 32    10H

| index | ADJACENT RADIO DEVICES |
|---|---|
| 1 | 35 |
| 2 | 36 |
| 3 | 37 |
| 4 | 38 |

(a)

ROUTING TABLE OF RADIO DEVICE 32    21B

| DESTINATION | NEXT RADIO DEVICES | HOP NUMBER | FLAG |
|---|---|---|---|
| 39 | 36 | 2 | 1 |
| 40 | 38 | 2 | 1 |
| 41 | 37 | 2 | 1 |
| 35 | 35 | 1 | 0 |

(b)

HLP1

| ------ | IPaddress32 | ------ | 1 |
|---|---|---|---|

(c)

NEIGHBOR LIST OF RADIO DEVICE 36    10J

| index | ADJACENT RADIO DEVICES |
|---|---|
| 1 | 32 |
| 2 | 37 |
| 3 | 38 |
| 4 | 39 |

NEIGHBOR LIST OF RADIO DEVICE 32  10K

| index | ADJACENT RADIO DEVICES |
|---|---|
| 1 | 35 |
| 2 | 36 |

(a)

NEIGHBOR LIST OF RADIO DEVICE 36  10L

| index | ADJACENT RADIO DEVICES |
|---|---|
| 1 | 32 |
| 2 | 37 |
| 3 | 38 |
| 4 | 39 |

NEIGHBOR LIST OF RADIO DEVICE 35　10M

| index | ADJACENT RADIO DEVICES |
|---|---|
| 1 | 31 |
| 2 | 32 |
| 3 | 33 |
| 4 | 34 |

(a)

NEIGHBOR LIST OF RADIO DEVICE 36　10N

| index | ADJACENT RADIO DEVICES |
|---|---|
| 1 | 37 |
| 2 | 38 |
| 3 | 39 |
| 4 | 41 |

(b)

NEIGHBOR LIST OF RADIO DEVICE 35　10P

| index | ADJACENT RADIO DEVICES |
|---|---|
| 1 | 31 |
| 2 | 32 |
| 3 | 33 |
| 4 | 34 |
| 5 | 36 |

(c)

ROUTING TABLE OF RADIO DEVICE 35　21C

| DESTINATION | NEXT RADIO DEVICES | HOP NUMBER | FLAG |
|---|---|---|---|
| 39 | 36 | 2 | 1 |
| 31 | 31 | 1 | 0 |
| 32 | 32 | 1 | 0 |
| 33 | 33 | 1 | 0 |
| 34 | 34 | 1 | 0 |

(d)

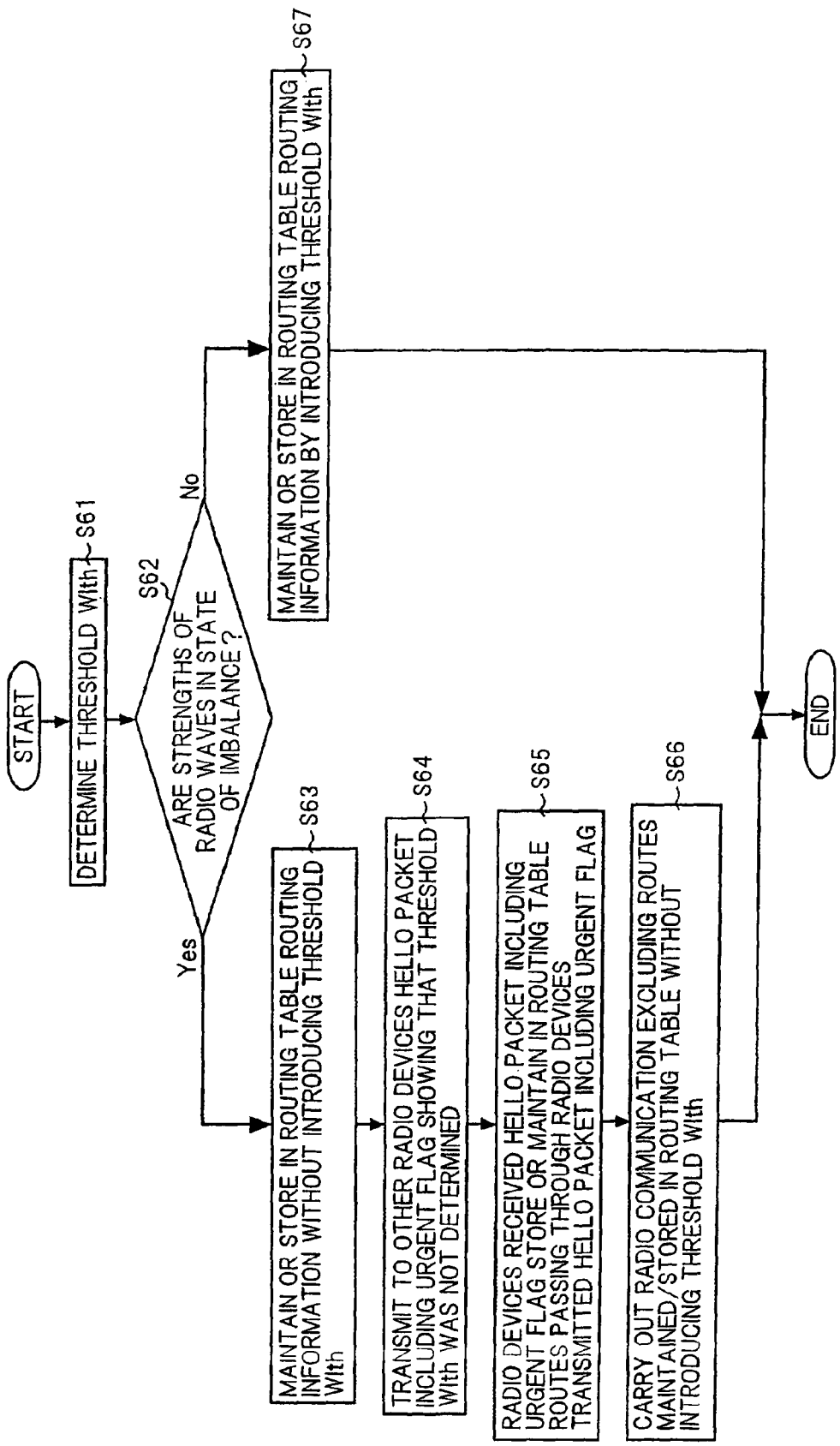

RADIO DEVICE FOR PREVENTING ISOLATED RADIO DEVICES IN NETWORK

BACKGROUND OF THE INVENTION

1. Field of the Invention

The present invention relates to a radio device, and more particularly to a radio device in an ad hoc network that is formed autonomously and instantaneously using a plurality of radio devices.

2. Description of the Related Art

An ad hoc network is constructed autonomously and instantaneously by mutual communication between a plurality of radio devices. In an ad hoc network, if two communicating radio devices are not present in each other's communication areas, a radio device positioned between the two radio devices functions as a router to relay data packets, and therefore a wide range multi-hop network can be formed.

Ad hoc networks have come to find various applications for example in radio communication networks in disaster stricken areas or streaming between vehicles in ITS (Intelligent Transport Systems) (Masahiro Watanabe, "Wireless Ad Hoc Network," Society of Automotive Engineers of Japan, Annual Spring Congresses in Yokohama, Humantronics Forum, pp. 18-23, May 2003).

Dynamic routing protocols that support multi-hop communication include table-driven protocols and on-demand protocols. The table-driven protocols allow control information related to routes to be regularly exchanged, so that a routing table is previously set, and known examples of the protocols include FSR (Fish-eye State Routing), OLSR (Optimized Link State Routing), and TBRPF (Topology Dissemination Based on Reverse-Path Forwarding).

The on-demand protocols allow a route to a destination to be made only when a demand for data transmission is issued, and known examples of the protocols include DSR (Dynamic Source Routing) and AODV (Ad Hoc On-Demand Distance Vector Routing).

In a conventional ad hoc network, when data communication is carried out from a source to a destination, the communication route is determined so that the number of hops between the source and the destination can be as small as possible (Guangyu Pei, et al., "Fisheye State Routing: A Routing Scheme for Ad Hoc Wireless Networks," ICC2000. Commun., Volume 1, L.A., pp. 70-74, June 2000).

However, a radio wave environment is unstable and therefore a route with less hops does not necessarily constitute a good quality route. Therefore, it would be better to select only a stable route by some method, and one such known typical method is to introduce a signal strength threshold and another known method is to measure a packet loss rate.

The method by measuring the packet loss rate is effectively applied when there are a number of continuous packet losses.

As the method of determining the signal strength threshold, a method of extracting a stable route using the average of signal strengths has been known (Rohit Dube, Cynthia D. Rais, Kuang-Yeh Wang, and Satish K. Tripathi, "Signal Stability-Based Adaptive Routing (SSA) for Ad Hoc Mobile Networks," IEEE Personal Communications, pp. 36-45, February 1997).

BRIEF SUMMARY OF THE INVENTION

There is a problem, however, with the method of selecting a stable route using signal strengths in that some radio devices will be isolated in a network if reception signal strengths received from other radio devices are low because of the imbalanced configuration of the radio devices in the network.

The invention is intended to solve the aforementioned problem, and an object of the invention is to provide a radio device that prevents isolation of radio devices in a network.

A radio device according to the invention is for use in an autonomously established radio network by which radio communication is carried out between a source and a destination and includes threshold determining means, table producing means and route maintaining means. The threshold determining means determines a threshold used to detect a strength equal to or more than the minimum strength of radio waves transmitted and received in a stable radio wave environment, based on a plurality of radio waves received from n (n is a positive integer) radio devices. The table producing means produces a routing table that shows routing information between the source and the destination based on the routing information of routes having a reception signal strength equal to or more than the determined threshold. The route maintaining means maintains the routing information stored in the routing table or stores the routing information in the routing table without introducing the determined threshold if strengths of radio waves are in a state of imbalance in the radio communication space between the radio device and the n radio devices.

The threshold determining means preferably includes signal strength detecting means, rearranging means, and setting means. The signal strength detecting means carries out signal strength detection processing to detect the first set of m (m is an integer equal to or more than a prescribed number) pairs of signal strengths including m maximum reception signal strengths and m minimum reception signal strengths corresponding to the m maximum reception signal strengths, based on the plurality of received radio waves. The rearranging means rearranges the detected first set of m pairs of signal strengths so that the m maximum reception signal strengths are in descending or ascending order and produces a second set of m pairs of signal strengths. The setting means detects first and second minimum reception signal strengths corresponding to two adjacent first and second maximum reception signal strengths having the largest difference among the m maximum reception signal strengths in the second set of m pairs of signal strengths and sets the threshold in the range defined as having the detected pair of first and second minimum reception signals as end values.

The route maintaining means preferably maintains the routing information stored in the routing table without introducing the threshold if the number of radio devices adjacent to the radio device when the threshold is introduced is less than the standard value.

The route maintaining means preferably unconditionally maintains the routing information stored in the routing if the number of radio devices included in an adjacent radio device list received from any of the n radio devices is less than the standard value.

The route maintaining means preferably maintains the routing information stored in the routing table without introducing the threshold if the reception signal strength is lower than the threshold and if the packet error rate is lower than the threshold.

Preferably, the route maintaining means unconditionally stores in the routing table the routing information of a route passing through a radio device adjacent to the radio device if the number of radio devices stored in a first adjacent radio device list of the radio device but not in a second adjacent radio device list received from the adjacent radio device is equal to or more than the standard value.

Preferably, the standard value is determined in accordance with the number of n radio devices.

Preferably, the radio device further includes transmitting means. The transmitting means transmits a packet including an urgent flag showing that the threshold was not determined if the routing information was maintained or stored by the route maintaining means without introducing the threshold.

Upon receiving a packet including the urgent flag from another radio devices, the route maintaining means preferably maintains or stores in the routing table the routing information of a route passing through the radio device that transmitted the packet including the urgent flag.

Preferably, the radio device further includes selecting means. The selecting means excludes from relay radio devices a radio device on a route whose routing information is maintained or stored without introducing the threshold.

The threshold determining means preferably redetermines the threshold when the topology of a radio network is changed.

The radio device according to the invention maintains or stores in the routing table the routing information without introducing the threshold if strengths of radio waves are in a state of imbalance in a radio communication space. That is to say, even if a route is would not otherwise be maintained or stored in the routing table because of the reception signal strength lower than the threshold, the route between a radio device with the reception signal strength lower than the threshold is maintained or stored in the routing table without introducing the threshold. More specifically, routes between radio devices with reception signal strengths lower than the threshold are maintained.

Therefore, according to the invention, isolation of radio devices in a network is prevented.

BRIEF DESCRIPTION OF THE SEVERAL VIEWS OF THE DRAWING

FIG. 3 is a diagram showing the structure of an IP header.

FIG. 12 shows other neighbor lists.

FIG. 13 shows other neighbor lists and a routing table.

FIG. 23 shows neighbor lists, a routing table and a Hello packet.

FIG. 24 shows other neighbor lists.

FIG. 26 shows other neighbor lists and a routing table.

FIG. 27 is a flowchart for use in illustrating the operation of preventing isolation of radio devices in a radio network system.

DETAILED DESCRIPTION OF THE INVENTION

Figure 1:
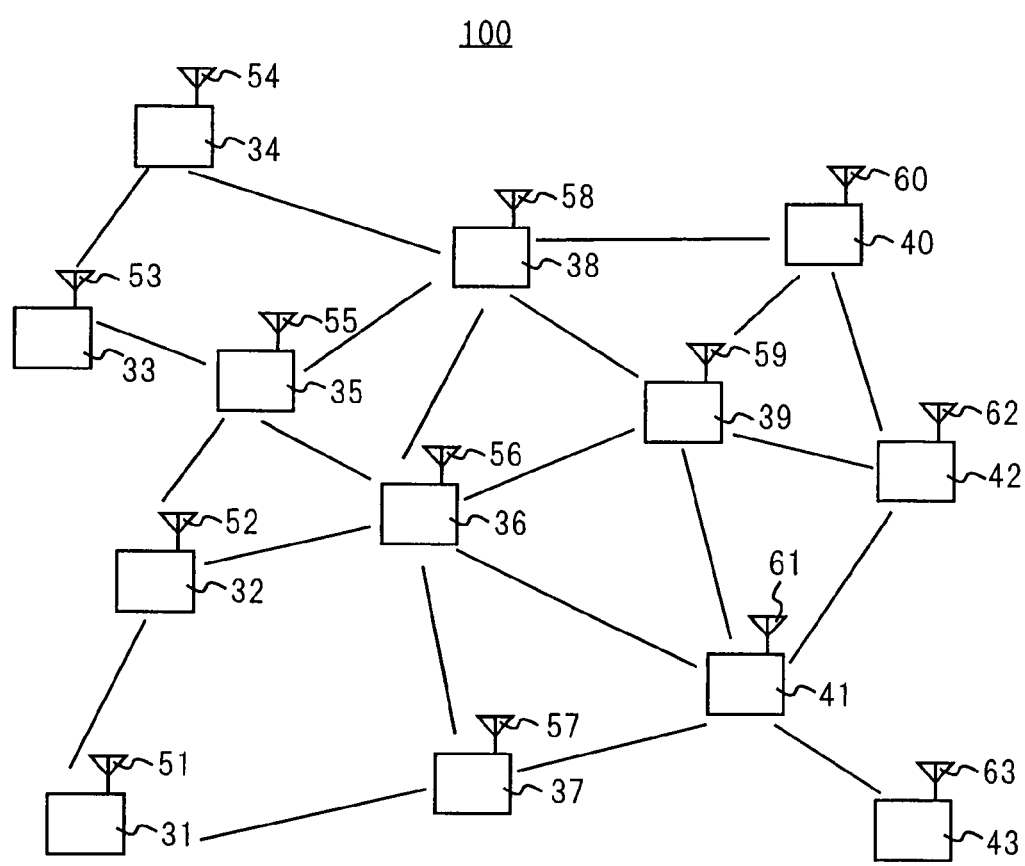
FIG. 1 is a schematic diagram of a radio network system using radio devices according to an embodiment of the invention.

Embodiments of the invention will be described in detail in conjunction with the accompanying drawings in which the same or corresponding portions are denoted by the same reference characters, and their description will not be repeated.

FIG. 1 is a schematic diagram of a radio network system using radio devices according to an embodiment of the invention. A radio network system 100 includes radio devices 31 to 43. The radio devices 31 to 43 are provided in a radio communication space and autonomously form a network. Antennas 51 to 63 are mounted to the radio devices 31 to 43, respectively.

When for example data is transmitted from the radio device 31 to the radio device 42, the radio devices 32 and 35 to 41 relay the data from the radio device 31 to the radio device 42.

In this way, the radio device 31 can carry out radio communication with the radio device 42 through various routes. More specifically, the radio device 31 can carry out radio communication with the radio device 42 either through the radio devices 37 and 41, or through the radio devices 32, 36 and 39, or through the radio devices 32, 35, 38, and 40.

When the radio communication is carried out through the radio devices 37 and 41, the hop number is "3" which is the smallest, when the radio communication is carried out through the radio devices 32, 36 and 39, the hop number is "4" and when the radio communication is carried out through the radio devices 32, 35, 38, and 40, the hop number is "5" which is the largest.

Therefore, if the route through the radio devices 37 and 41 is selected to carry out radio communication, the hop number is "3" which is the smallest.

However, the use of the route from the radio device 31 through the radio devices 37 and 41 to the radio device 42 does not necessarily secure stable radio communication between the radio device 31 and the radio device 42.

Therefore, in the following paragraphs, a method of producing a routing table including a stable route and carrying out radio communication between the source and the destination based on the produced routing table in the radio network system 100 will be described.

Note that the OLSR protocol is employed as an example of protocol used to establish a transmission path between the source and the destination. The OLSR protocol is a table driven type routing protocol, according to which routing information is exchanged using Hello messages and TC (Topology Control) messages to produce a routing table.

Figure 2:
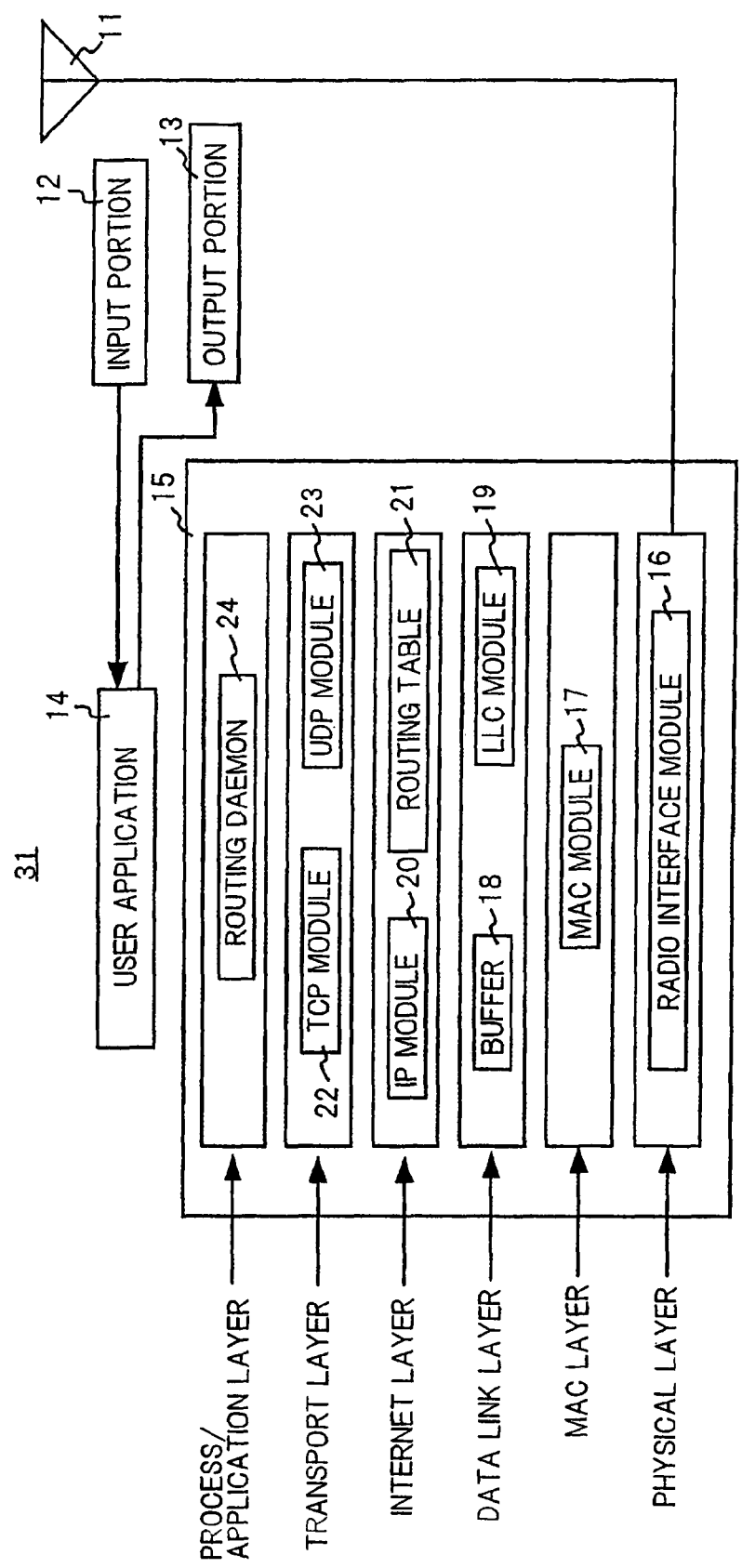
FIG. 2 is a schematic block diagram of the configuration of a radio device shown in FIG. 1 according to a first embodiment of the invention.

FIG. 2 is a schematic block diagram of the configuration of the radio device 31 shown in FIG. 1. The radio device 31 includes an antenna 11, an input portion 12, an output portion 13, a user application 14, and a communication control unit 15.

The antenna 11 forms each of the antennas 51 to 63 shown in FIG. 1. The antenna 11 receives data from another radio device through a radio communication space, outputs the received data to the communication control unit 15, and transmits data from the communication control unit 15 to another radio device through the radio communication space.

The input portion 12 accepts a message and the destination of data input by the operator of the radio device 1 and outputs the accepted message and destination to the user application 14. The output portion 13 displays the message according to control by the user application 14.

The user application 14 produces data based on the message and destination from the input portion 12 and outputs the data to the communication control unit 15.

The communication control unit 15 includes a plurality of modules that carry out communication control according to the ARPA (Advanced Research Projects Agency) Internet hierarchical structure. More specifically, the communication control unit 15 includes a radio interface module 16, a MAC (Media Access Control) module 17, a buffer 18, an LLC (Logical Link Control) module 19, an IP (Internet Protocol) module 20, a routing table 21, a TCP module 22, a UDP module 23, and a routing daemon 24.

The radio interface module 16 belongs to the physical layer and modulates/demodulates transmission signals or reception signals according to a prescribed specification and transmits/receives signals through the antenna 11. The radio interface module 16 detects the reception signal strength of a Hello packet received by the antenna 11 from another radio device and outputs the detected reception signal strength to the routing daemon 24.

The MAC module 17 belongs to the MAC layer and carries out an MAC protocol to perform various functions that will be described.

More specifically, the MAC module 17 broadcasts the Hello packet received from the routing daemon 24 through the radio interface module 16.

The MAC module 17 carries out re-transmission control of data (packets).

The buffer 18 belongs to the data link layer and temporarily stores packets.

The LLC module 19 belongs to the data link layer, and connects and releases a link between adjacent radio devices by carrying out an LLC protocol.

The IP module 20 belongs to the Internet layer and generates an IP packet. The IP packet includes an IP header and an IP data portion used to store a packet of a higher order protocol. Upon receiving data from the TCP module 22, the IP module 20 stores the received data in the IP data portion and produces the IP packet.

In this way, the IP module 20 searches the routing table 21 according to the OLSR protocol that is a table driven type routing protocol and determines a route through which the generated IP packet is to be transmitted. The IP module 20 then transmits the IP packet to the LLC module 19 and transmits the IP packet to the destination in the determined route.

The routing table 21 belongs to the Internet layer and stores routing information in association with each destination as will be described.

The TCP module 22 belongs to the transport layer and produces a TCP packet. The TCP packet includes a TCP header and a TCP data portion used to store data of a higher-order protocol. The TCP module 22 transmits the produced TCP packet to the IP module 20.

The UDP module 23 belongs to the transport layer, broadcasts an Update packet produced by the routing daemon 24, receives an Update packet broadcast by another radio device and outputs the packet to the routing daemon 24.

The routing daemon 24 belongs to the process/application layer, monitors the state of execution of other communication control modules, and processes requests from the other communication control modules.

The routing daemon 24 determines a threshold used to determine whether the reception signal strength is equal to or more than the minimum strength of waves transmitted/received in a stable radio wave environment by a method that will be described, and dynamically produces a routing table 21 in the Internet layer by calculating the optimum route based on the routing information of the Hello packet having a reception signal strength equal to or more than the determined threshold.

The routing daemon 24 produces a Hello packet including various messages such as information related to adjacent radio devices and outputs the produced Hello packet to the MAC module 17 upon transmitting the routing information in the radio network system 100 to another radio device.

The routing daemon 24 determines, by the method that will be described, whether there is an imbalance between strengths of radio waves in a radio communication space around the radio device 31. If there is an imbalance between strengths of radio waves, the routing daemon 24 maintains the routing information stored in the routing table 21 without introducing the threshold.

Note that the radio devices 32 to 43 in FIG. 1 each have the same configuration as that of the radio device 31 shown in FIG. 2.

FIG. 3 shows the structure of the IP header. The IP header includes a version, a header length, a service type, a packet length, an ID number, a flag, a fragment offset, time to live, a protocol, a header checksum, a source IP address, a destination IP address, and an option.

Figure 4:
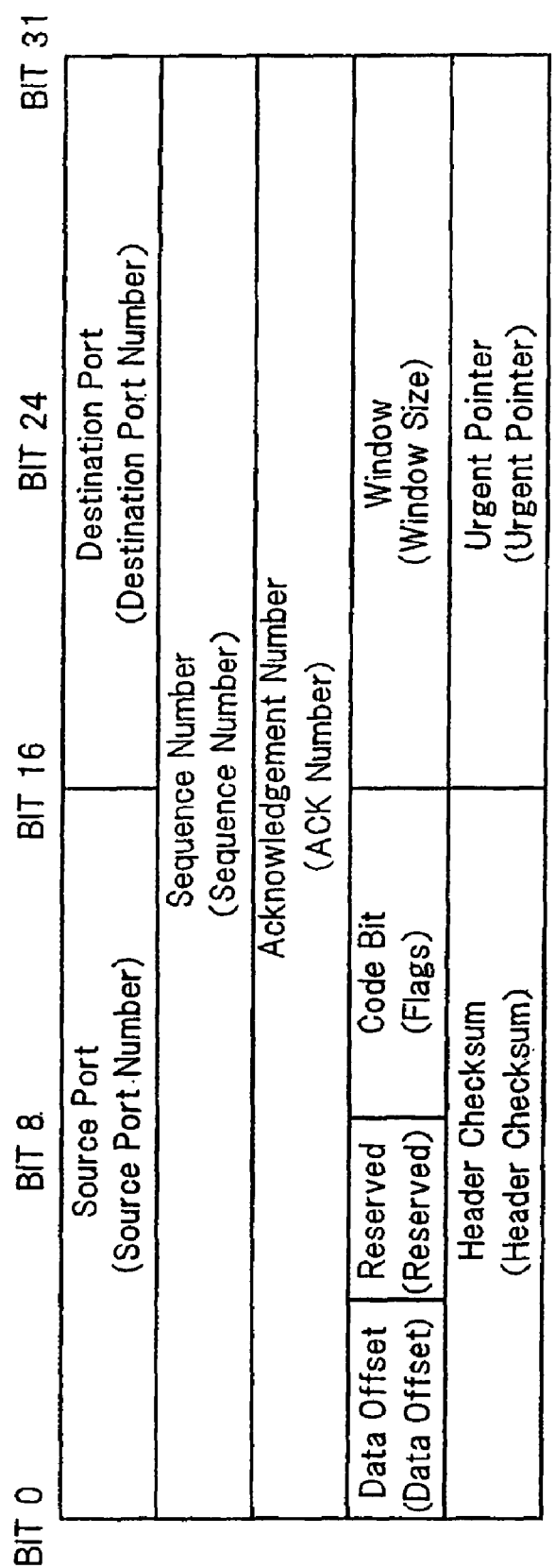
FIG. 4 is a diagram showing the structure of a TCP header.

FIG. 4 shows the structure of the TCP header. The TCP header includes a source port number, a destination port number, a sequence number, an acknowledgment (ACK) number, a data offset, a reservation, a flag, a window size, a header checksum, and an urgent pointer.

The source port number is a number used to specify the application that has output a TCP packet among a plurality of applications in operation at the source radio device. The destination port number is a number used to specify the application that delivers a TCP packet among a plurality of applications in operation at the destination radio device.

The TCP communication is an end-to-end connection type communication protocol. The TCP module 22 of a radio device that requests a TCP communication connection (hereinafter referred to as "TCP communication connection requester") transmits a first packet that indicates a connection request having SYN (Synchronize Flag) set at the Code Bit in the TCP header to the TCP module 22 of a terminal to accept the TCP communication connection (hereinafter referred to as "TCP communication connection acceptor") when a connection is established. In response, the TCP module 22 of the TCP communication connection acceptor transmits a second packet that indicates the connection request acceptance and the completion of the connection having SYN and ACK (acknowledgment) set at the Code Bit in the TCP header to the TCP module 22 of the TCP communication connection requester. Then, in response, the TCP module 22 of the TCP communication connection requester transmits a third packet that indicates the completion of the connection having ACK (acknowledgement) set at the Code Bit in the TCP header to the TCP module 22 of the TCP communication connection acceptor.

A disconnection request can be made either from the TCP communication connection requester or the TCP communication connection acceptor. The TCP module 22 of a radio device that requests a TCP communication disconnection (hereinafter referred to as "TCP communication disconnection requester") transmits a first packet that indicates a disconnection request having FIN (Finish Flag) set at the Code Bit in the TCP header to a radio device to accept the TCP communication disconnection (hereinafter referred to as "TCP communication disconnection acceptor") when the connection is disconnected. In response, the TCP module 22 of the TCP communication disconnection acceptor transmits a second packet that indicates disconnection request acceptance having ACK (acknowledgment) set at the Code Bit in the TCP header and a third packet that indicates the completion of the disconnection having FIN set at the Code Bit in the TCP header to the TCP module 22 of the TCP communication disconnection requester. In response, the TCP module 22 of the TCP communication disconnection requester transmits a fourth packet that indicates the completion of disconnection having ACK (acknowledgement) set at the Code Bit in the TCP header to the TCP module 22 of the TCP communication disconnection acceptor.

Figure 5:
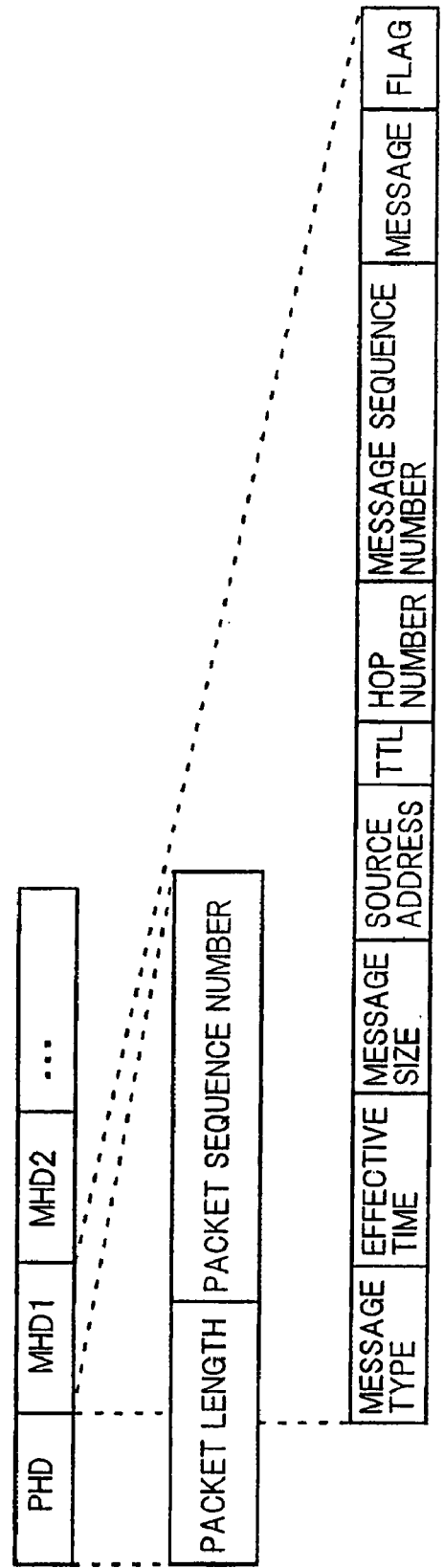
FIG. 5 is a diagram showing the structure of a packet PKT in the OLSR protocol.

FIG. 5 shows the structure of a packet PKT in the OLSR protocol. The packet PKT includes a packet header PHD, message headers MHD1, MHD2, . . . . Note that the packet PKT is transmitted/received using the port number 698 of the UDP module 23.

The packet header PHD includes a packet length and a packet sequence number. The packet length includes 16-bit data and represents the byte number of the packet. The packet sequence number includes 16-bit data and is used to specify which packet is new. The packet sequence number is incremented by "1" every time a new packet is generated. Therefore, larger packet numbers represent newer packets PKT.

The message headers MHD1, MHD2, . . . each include a message type, effective time, a message size, a source address, a TTL, a hop number, a message sequence number, message, and a flag.

The message type includes 8-bit data and represents the type of the message written in the message main body, and 0 to 127 have been reserved. The effective time includes 8-bit data and represents time for which the message must be maintained after the reception. The effective time includes a mantissa part and an exponent part.

The message size includes 16-bit data and represents the length of the message. The source address includes 32-bit data and represents the radio device that has produced the message. The TTL includes 8-bit data and specifies the maximum hop number with which a message is to be relayed. The TTL is decremented by "1" every time the message is relayed. If the TTL is "0" or "1", the message will not be relayed. The hop number includes 8-bit data and represents the hop number from the generator of the message. The hop number is initially set to "0" and incremented by "1" for every relay. The message sequence number includes 16-bit data and represents an identification number allocated to each message. The message sequence number is incremented by "1" every time a message is produced. The message is a message to be transmitted. The flag represents whether a threshold was determined. If a threshold was not determined, the flag is set to "1", and if determined, the flag is set to "0".

In the OLSR protocol, various kinds of messages are transmitted and received using packets PKT having the structure shown in FIG. 5.

Figures 6, 7:
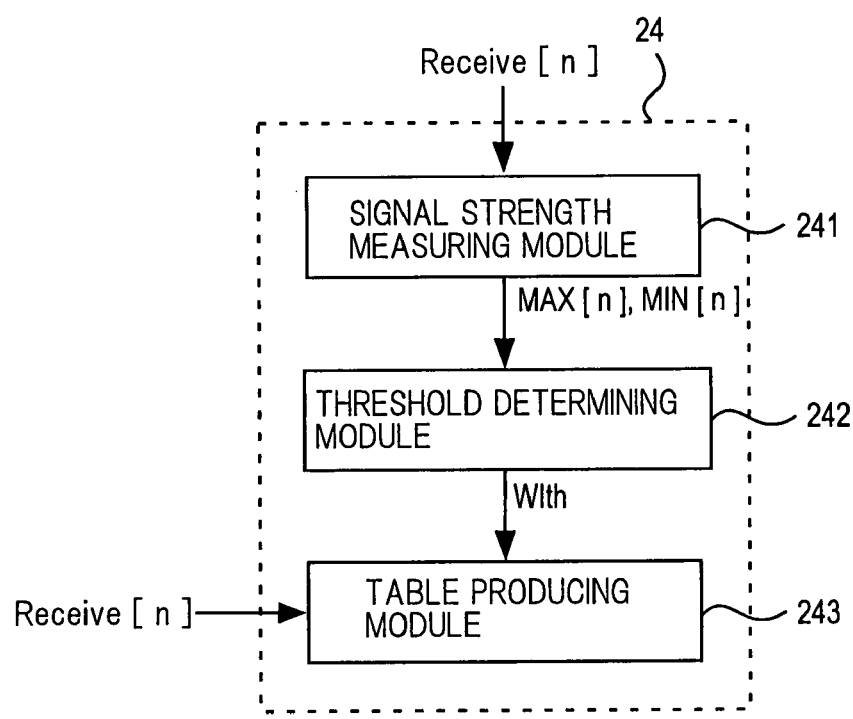
FIG. 6 is a diagram of the routing table shown in FIG. 2.
FIG. 7 is a functional block diagram of the routing daemon in FIG. 2.

FIG. 6 shows the structure of the routing table 21 in FIG. 2. The routing table 21 includes a destination, the next radio device, a hop number, and a flag. The destination, the next radio device, the hop number, and the flag are associated with one another. The "destination" represents the IP address of the radio device at the destination. The "next radio device" represents the IP address of the radio device to which the packet PKT is to be transmitted next when the packet is transmitted to the destination. The "hop number" represents the hop number to the destination. In FIG. 1, for example if radio communication is carried out between the radio device 31 and the radio device 42 using the route from the radio device 31 through the radio device 32, the radio device 36, and the radio device 39 to the radio device 42, "3" is stored for the hop number in the routing table 21 of the radio device 32. The flag represents whether a route was maintained without introducing the threshold. If the route was maintained without introducing the threshold, the flag is set to "1", and if maintained by introducing the threshold, the flag is set to "0".

FIG. 7 is a functional block diagram of the routing daemon 24 shown in FIG. 2. The routing daemon 24 includes a signal strength measuring module 241, a threshold determining module 242, and a table producing module 243.

The signal strength measuring module 241 receives a plurality of reception signal strengths Receive[n] in Hello packets received at the antenna 11 from the radio interface module 16, detects m (a prescribed number such as an integer not less than five) pairs of maximum and minimum values MAX[n] and MIN[n] including m pairs of maximum values MAX[n] and m pairs of minimum values MIN[n] corresponding to the m maximum values MAX[n] based on the received plurality of reception signal strengths Receive[n] and outputs the detected m pairs of maximum and minimum values MAX[n] and MIN[n] to the threshold determining module 242.

Figures 10, 11:
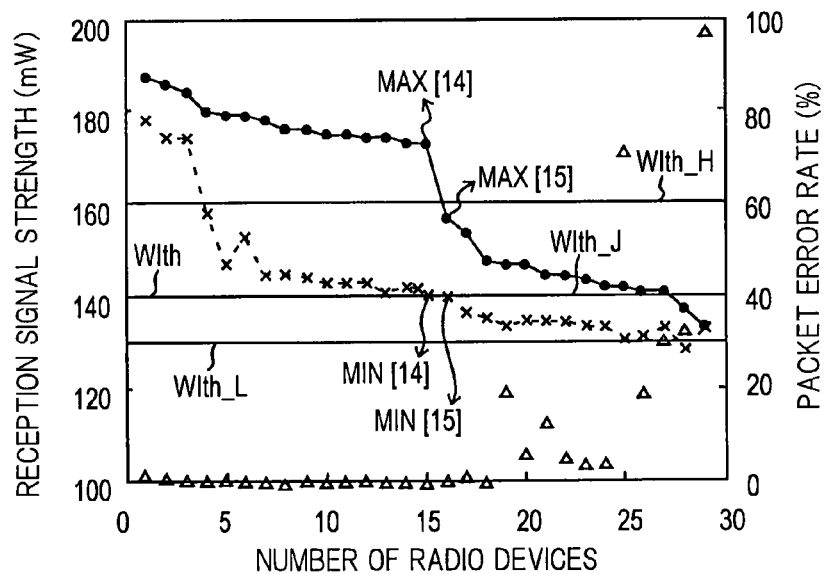
FIG. 10 shows the relation between the reception signal strength and the packet error rate and the number of radio devices when a plurality of maximum values are rearranged in descending order.
FIG. 11 shows neighbor lists including information related to adjacent radio devices.

Note that m is set to a prescribed value (such as an integer not less than five) because if at least five pairs of maximum and minimum values MAX[1] and MIN[1] to MAX[m] and MIN[m] can be detected, a threshold WIth used to detect all the reception signal strengths of radio waves transmitted/received in a stable radio wave environment can be determined highly reliably based on those at least five pairs of maximum and minimum values MAX[1] and MIN[1] to MAX[m] and MIN[m] as will be described in conjunction with FIG. 10.

The threshold determining module 242 determines the threshold WIth based on the m pairs of maximum and minimum values MAX[n] and MIN[n] from the signal strength measuring module 241 by the method that will be described and outputs the determined threshold WIth to the table producing module 243.

Upon receiving the threshold WIth from the threshold determining module 242, the table producing module 243 compares the reception signal strengths Receive[n] of the Hello packets received from the radio interface module 16 to the threshold WIth, extracts Hello packets having a reception signal strength Receive[n] equal to or more than the threshold WIth, and dynamically produces a routing table 21 shown in FIG. 6 based on the extracted Hello packets.

The table producing module 243 determines whether the number of radio devices adjacent to the radio device with which the table producing module 243 itself is provided is less than a standard value (such as five) based on the neighbor list of the radio device with which the table producing module 243 itself is provided. More specifically, the table producing module 243 determines whether the number of adjacent radio devices left on the neighbor list will be less than the standard value if the threshold WIth is introduced.

If the number of adjacent radio devices is less than the standard value, the table producing module 243 maintains the routing information stored in the routing table 21 without introducing the threshold WIth. If the number of adjacent radio devices is equal to or more than the standard value, the table producing module 243 maintains or deletes the routing information stored in the routing table 21 introducing the threshold WIth.

If the routing information was maintained without introducing the threshold WIth, the table producing module 243 produces and transmits to other radio devices a Hello packet including a flag Fnd which shows that the threshold WIth was not determined.

Upon receiving the Hello packet including the flag Fnd from another radio device, the table producing module 243 unconditionally stores in the neighbor list the radio device that has transmitted the Hello packet.

How the routing table 21 according to the OLSR protocol is produced will be described in detail. The radio devices 31 to 43 each transmit/receive Hello messages and TC messages in order to produce a routing table 21.

The Hello message is regularly transmitted in order to distribute information the radio devices 31 to 43 have. The radio devices 31 to 43 each receive the Hello messages and then collect information related to adjacent radio devices, and determine which radio devices are present around it.

In the OLSR protocol, the radio devices 31 to 43 each manage local link information. The Hello message is a message used to form and transmit the local link information. The local link information includes a "link set," an "adjacent radio device set," an "two-hop neighbor radio device set and a link set to these radio devices," an "MPR (Multi-point Relay) set", and an "MPR selector set."

The link set is the set of radio devices to which radio waves can directly arrive (adjacent radio devices), and each link is represented by the effective time of a pair of addresses for two radio devices. Note that the effective time is also used to represent whether the link is one-way or two-way.

The adjacent radio device set includes the addresses of the adjacent radio devices and the willingness of retransmission of the radio devices. The two-hop neighbor radio device set represents a set of radio devices neighboring the adjacent radio devices.

The MPR set is a set of radio devices selected as MPRs. Note that an MPR is a relay selected so that the radio devices 31 to 43 each transmit the packet PKT only once occasion when each packet PKT is transmitted to all the radio devices 31 to 43 in the radio network system 100.

The MPR selector set represents a set of the other radio devices that have selected the radio device as one of their MPRs.

The process of how the local link information is established is generally as follows. A Hello message including its own address is transmitted by each of the radio devices 31 to 43 to an adjacent radio device in order to notify their presence at an earlier stage. This is carried out by all the radio devices 31 to 43, and the radio devices 31 to 43 are notified of the presence of the radio devices around them and as to which addresses these radio devices have. In this way, the link set and the adjacent radio device set are formed.

The formed local link information continues to be transmitted by Hello messages on a regular-basis. This is repeated to gradually clarify if each link is two-way or which radio device exists beyond of the adjacent radio devices. The radio devices 31 to 43 each include local link information gradually formed in this manner.

Information related to MPR is also regularly transmitted by Hello messages and notified to the radio devices 31 to 43. The radio devices 31 to 43 each select several radio devices among adjacent radio devices as a MPR set and ask these radio devices to retransmit a packet PKT transmitted from them. Information related to the MPR set is transmitted to the adjacent radio devices by Hello messages, and therefore the radio device that receives the Hello message manages the set of the radio devices selected itself as MPR as "MPR selector set." In this way, the radio devices 31 to 43 each can instantaneously determine whether a packet PKT received from which radio device should be retransmitted.

Once a local link set is formed in each of the radio devices 31 to 43 by transmission/reception of Hello messages, a TC message to notify the topology of the entire radio network system 100 is transmitted to the radio devices 31 to 43. The TC message is transmitted regularly by all the radio devices selected as MPRs. The TC messages include links between the radio devices and the MPR selector set, and therefore all the radio devices 31 to 43 in the radio network system 100 can be informed of all the MPR sets and all the MPR selector sets and of the topology of the entire radio network system 100 based on all the MPR sets and all the MPR selector sets. The radio devices 31 to 43 each calculate the shortest routes using the topology of the entire radio network system 100 and produces a route table based on the routes.

Note that the radio devices 31 to 43 frequently exchange TC messages separately from the Hello messages. The MPR's are also used to exchange the TC messages.

The UDP module 23 of each of the radio devices 31 to 43 transmits/receives the above-described Hello messages and the TC messages, and the table producing module 243 of the routing daemon 24 recognizes the topology of the entire radio network system 100 based on Hello messages and TC messages having a reception signal strength equal to or more than the threshold WIth among the Hello messages and TC messages received by the UDP module 23, calculates the shortest route based on the topology of the entire radio network system 100, and dynamically produces the routing table 21 shown in FIG. 6 based on the calculated route.

Now, a method of determining the threshold WIth will be described. How the radio device 36 shown in FIG. 1 determines the threshold WIth will be described by way of illustration.

When the radio device 36 determines the threshold WIth, the radio device 36 detects a plurality of reception signal strengths as the reception strengths of a plurality of Hello packets received during a prescribed period from the radio devices 32, 35, 37 to 39, and 41 within one hop, and extracts the maximum value MAX[n] and the minimum value NIN[n] of the reception signal strengths from the plurality of detected reception signal strengths.

More specifically, in the radio device 36, the signal strength measuring module 241 in the routing daemon 24 sequentially receives the m reception signal strengths Receive[32]1 to Receive[32]m of m Hello packets sequentially received from the radio device 32 for a prescribed period through the radio interface module 16. The signal strength measuring module 241 detects a pair of maximum and minimum values MAX

[32] and MIN[32] of the sequentially received m reception signal strengths Receive[32]1 to Receive[32]m.

In this case, the signal strength measuring module 241 sets the first reception signal strength Receive[32]1 as the maximum value MAX[32] and the minimum value MIN[32] and compares the reception signal strengths Receive[32]2 to Receive[32]m received second and on to the maximum value MAX[32] and the minimum value MIN[32]. The signal strength measuring module 241 updates the maximum value MAX[32] by the reception signal strengths Receive[32]2 to Receive[32]m if the reception signal strengths Receive[32]2 to Receive[32]m are larger than the maximum value MAX[32], updates the minimum value MIN[32] by the reception signal strengths Receive[32]2 to Receive[32]m if the Receive[32]2 to Receive[32]m are smaller than the minimum value MIN[32], and thus detects the pair of the maximum and minimum values MAX[2] and MIN[32].

The signal measuring module 241 sequentially receives, through the radio interface module 16, m reception signal strengths Receive[35]1 to Receive[35]m, Receive[37]1 to Receive[37]m, Receive[38]1 to Receive[38]m, Receive[39]1 to Receive[39]m, and Receive[41]1 to Receive[41]m sequentially received from the radio devices 35, 37, 38, 39, and 41 for a prescribed period and similarly detects pairs of maximum and minimum values MAX[35] and MIN[35]; MAX[37] and MIN[37]; MAX[38] and MIN[38]; MAX[39] and MIN[39]; and MAX[41] and MIN[41] based on the m received reception signal strengths Receive[35]1 to Receive[35]m, Receive[37]1 to Receive[37]m, Receive[38]1 to Receive[38]m, Receive[39]1 to Receive[39]m, and Receive[41]1 to Receive[41]m.

The signal strength measuring module 241 outputs the detected six pairs of maximum and minimum values MAX[32] and MIN[32]; MAX[35] and MIN[35]; MAX[37] and MIN[37]; MAX[38] and MIN[38]; MAX[39] and MIN[39]; and MAX[41] and MIN[41] as six pairs of maximum and minimum values MAX[0] and MIN[0]; MAX[1] and MIN[1]; MAX[2] and MIN[2]; MAX[3] and MIN[3]; MAX[4] and MIN[4]; and MAX[5] and MIN[5] to the threshold determining module 242.

Figure 8:
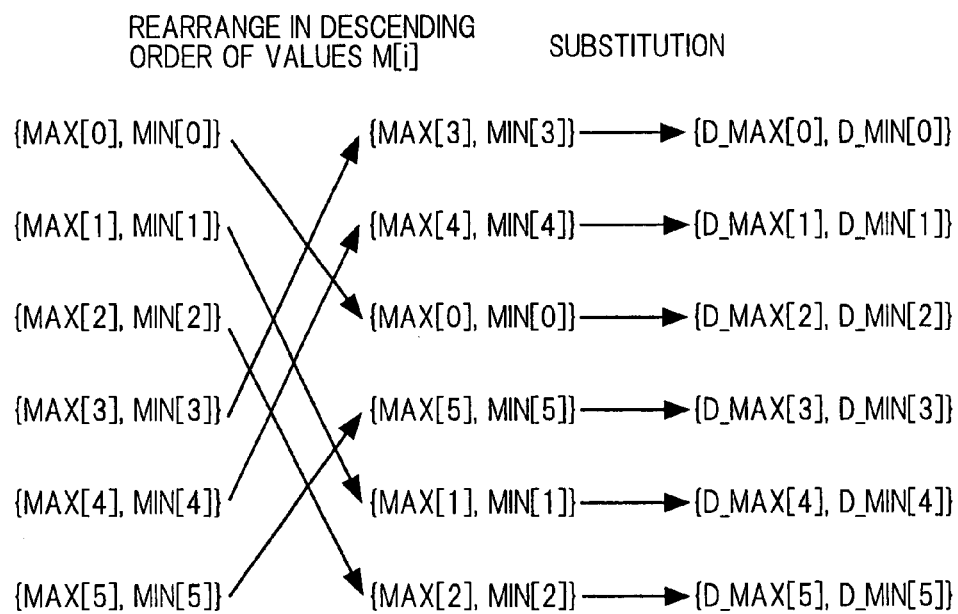
FIG. 8 shows the concept of rearrangement.

FIG. 8 shows how rearrangement is performed. The threshold determining module 242 receives the six pairs of maximum and minimum values MAX[0] and MIN[0]; MAX[1] and MIN[1]; MAX[2] and MIN[2]; MAX[3] and MIN[3]; MAX[4] and MIN[4]; and MAX[5] and MIN[5] from the signal strength measuring module 241 and rearranges the six pairs of maximum and minimum values MAX[0] and MIN[0]; MAX[1] and MIN[1]; MAX[2] and MIN[2]; MAX[3] and MIN[3]; MAX[4] and MIN[4]; and MAX[5] and MIN[5] so that the six maximum values MAX[0], MAX[1], MAX[2], MAX[3], MAX[4], and MAX[5] are in descending order.

More specifically, the threshold determining module 242 rearranges them in the order of the pairs of maximum and minimum values MAX[3] and MIN[3]; MAX[4] and MIN[4]; MAX[0] and MIN[0]; MAX[5] and MIN[5]; MAX[1] and MIN[1]; and MAX[2] and MIN[2], and assigns the pairs of maximum and minimum values MAX[3] and MIN[3]; MAX[4] and MIN[4]; MAX[0] and MIN[0]; MAX[5] and MIN[5]; MAX[1] and MIN[1]; and MAX[2] and MIN[2] as a second set of pairs of maximum and minimum values {D_MAX[0], D_MIN[0]}, {D_MAX[1], D_MIN[1]}, {D_MAX[2], D_MIN[2]}, {D_MAX[3], D_MIN[3]}, {D_MAX[4], D_MIN[4]}, and {D_MAX[5], D_MIN[5]}, respectively.

Then, the threshold determining module 242 detects two adjacent maximum values having the largest difference among the six maximum values D_MAX[0] to D_MAX[5], and two pairs of maximum and minimum values {D_MAX[i], D_MIN[i]} and {D_MAX[i+1], D_MIN[i+1]} including the two adjacent maximum values and determines the average of the two minimum values D_MIN[i] and D_MIN[i+1] included in the detected two pairs of maximum and minimum values {D_MAX[i], D_MIN[i]} and {D_MAX[i+1], D_MIN[i+1]} as the threshold WIth.

Figure 9:
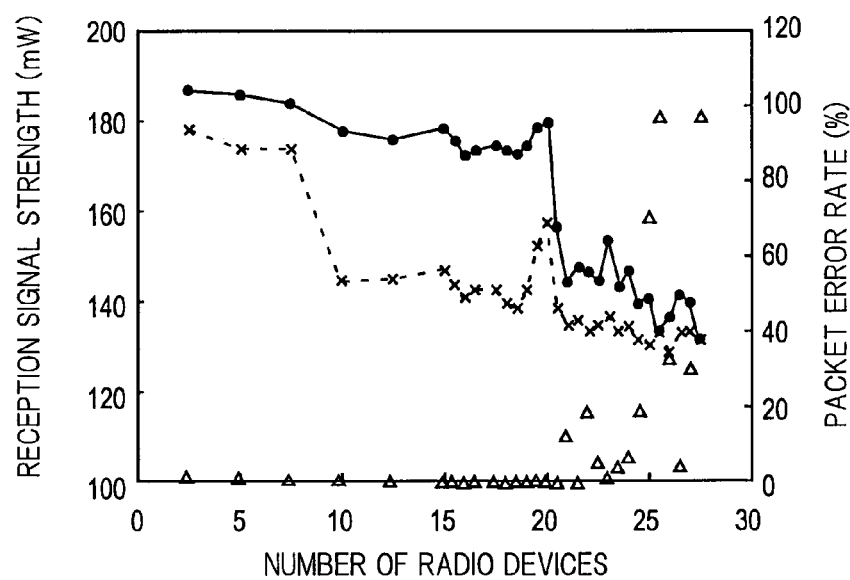
FIG. 9 shows the relation between the reception signal strength and the number of radio devices.

A result of experiments carried out to determine the threshold WIth will be described. FIG. 9 shows the relation of the reception signal strength and the packet error rate with respect to the number of radio devices. In FIG. 9, the ordinate represents the reception signal strength and the packet error rate, and the abscissa represents the number of radio devices.

FIG. 9 shows the plots of the pairs of maximum and minimum values MAX[n] and MIN[n] of the reception signal strengths of Hello packets received from a plurality of radio devices within one hop for a prescribed period. In this case, "●" represents the maximum value MAX[n] of the reception signal strengths, "x" represents the minimum value MIN[n] of the reception signal strengths, and "Δ" represents the packet error rate.

FIG. 10 shows the relation of the reception signal strengths and the packet error rate with respect to the number of radio devices when a plurality of maximum values are rearranged in descending order. In FIG. 10, the ordinate represents the reception signal strength and the packet error rate, and the abscissa represents the number of radio devices. In this case, "●" represents the maximum value MAX[n] of the reception signal strengths, "x" represents the minimum value MIN[n] of the reception signal strengths, and "Δ" represents the packet error rate.

As can be clearly understood from FIG. 9, the maximum values vary as the number of radio devices increases and are not in descending order. Therefore, the plurality of pairs of maximum and minimum values are rearranged so that the maximum values are in descending order as shown in FIG. 10.

Two pairs of maximum and minimum values {D_MAX(14), D_MIN(14)}, and {D_MAX(15), D_MIN(15)}, the two adjacent maximum values of which have the largest difference, are detected and the average of the two minimum values D_MIN(14) and D_MIN(15) is determined as the threshold WIth.

In FIG. 10, in the region on the right of the pair of maximum and minimum values MAX[14] and MIN[14], the maximum values of the reception signal strengths are much lower, and the packet error rate varies.

Meanwhile, in the region on the left of the pair of maximum and minimum values MAX[15] and MIN[15], the maximum values of the reception signal strengths are larger and the packet error rate is about 0% if the number of radio devices increases. Therefore, in the region on the left of the pair of maximum and minimum values MAX[15] and MIN[15], all the reception signal strengths of the radio waves transmitted/received in a stable radio wave environment are distributed, and in the region on the right of the pair of maximum and minimum values MAX[14] and MIN[14], all the reception signal strengths of the radio waves transmitted/received in an unstable radio wave environment are distributed.

Consequently, detection of reception signal strengths equal to or more than the threshold WIth is equal to detection of all the radio waves transmitted/received in a stable radio wave environment.

Therefore, all the radio waves transmitted/received in a stable radio wave environment can be detected by determining the threshold WIth according to the above-described method and all the radio waves transmitted/received in an unstable radio wave environment can be excluded.

The threshold determining module 242 determines the threshold WIth and then outputs the determined threshold WIth to the table producing module 243.

A method of producing a routing table 21 will be described. FIG. 11 shows a neighbor list including information related to adjacent radio devices. FIG. 12 shows tables for other neighbor lists. FIG. 13 shows tables for other neighbor lists and the routing table.

FIG. 11 shows the neighbor list stored by the radio device 36 shown in FIG. 1, FIG. 12 shows the neighbor lists stored by the radio devices 32, 35, 37, and 38, respectively shown in FIG. 1, and FIG. 13 shows the neighbor lists stored by the radio devices 39 and 41 shown in FIG. 1 and the routing table stored by the radio device 36.

In the radio device 36, the threshold determining module 242 determines a threshold WIth according to the above-described method and outputs the determined threshold WIth to the table producing module 243.

The table producing module 243 of the radio device 36 receives Hello packets PKT1 to PKT6 received from the radio devices 32, 35, 38, 37, 39, and 41 through the UDP module 23, and reads out the neighbor lists 10B, 10C, 10D, 10E, 10F, and 10G from the received Hello packets PKT1 to PKT6, respectively.

The table producing module 243 detects the radio devices 32, 35, 37, 38, 39, and 41 as being adjacent to the radio device 36 based on the read out neighbor lists 10B, 10C, 10D, 10E, 10F, and 10G and produces a neighbor list 10.

The table producing module 243 receives, through the radio interface module 16, reception signal strengths Receive [32], Receive[35], Receive[38], Receive[37], Receive[39], and Receive[41] when the Hello packets PKT1 to PKT6 are received.

In this way, the table producing module 243 compares each of the reception signal strengths Receive[32], Receive[35], Receive[38], Receive[37], Receive[39], and Receive[41] to the threshold WIth, and extracts reception signal strengths equal to or more than the threshold WIth from the reception signal strengths Receive [32], Receive [35], Receive [38], Receive [37], Receive[39], and Receive[41].

If for example only the reception signal strength Receive [37] is smaller than the threshold WIth, the table producing module 243 removes the radio device 37 from the neighbor list 10 and produces a neighbor list 10A. More specifically, the table producing module 243 selects the radio devices 32, 35, 38, 39, and 41 whose reception signal strengths between the radio device 36 are equal to or more than the threshold WIth among the radio devices 32, 35, 37, 38, 39, and 41 as adjacent radio devices to the radio device 36.

Thereafter, the table producing module 243 produces a routing table 21A based on the neighbor lists 10B, 10C, 10D, 10F, and 10G, and TC messages including information related to the topology (see FIG. 13C).

The table producing module 243 can detect the radio device 38 as being adjacent to the radio devices 36, 39, and 40 with reference to the neighbor list 10D and the radio device 39 as being adjacent to the radio devices 36 and 40 with reference to the neighbor list 10F. Consequently, the table producing module 243 detects the radio device 40 being positioned in a location "two hops" from the radio device 36 and produces a route in the first row of the routing table 21A.

The table producing module 243 can detect the radio device 39 as being adjacent to the radio devices 36 and 42 with reference to the neighbor list 10F and the radio device 41 as being adjacent to the radio devices 36, 39, and 42 with reference to the neighbor list 10G. Consequently, the table producing module 243 detects the radio device 42 being positioned in a location "two hops" from the radio device 36, and produces a route in the second row of the routing table 21A.

Furthermore, the table producing module 243 can detect the radio device 41 as being adjacent to the radio devices 36, 39, and 43 with reference to the neighbor list 10G. Consequently, the table producing module 243 detects the radio device 43 being positioned in a location "two hops" from the radio device 36 and produces a route in the third row of the routing table 21A. In this case, since the table producing module 243 produced the routing table 21A by introducing the threshold WIth, the flags are set to "0" in the routing table 21.

As described above, the routing table 21 can be produced based on Hello packets transmitted/received in a stable radio wave environment by determining the threshold WIth.

Consequently, the information related to the radio devices adjacent to each radio device is not frequently changed and a stable routing table 21 can be produced, so that stable routing can be carried out.

Figure 14:
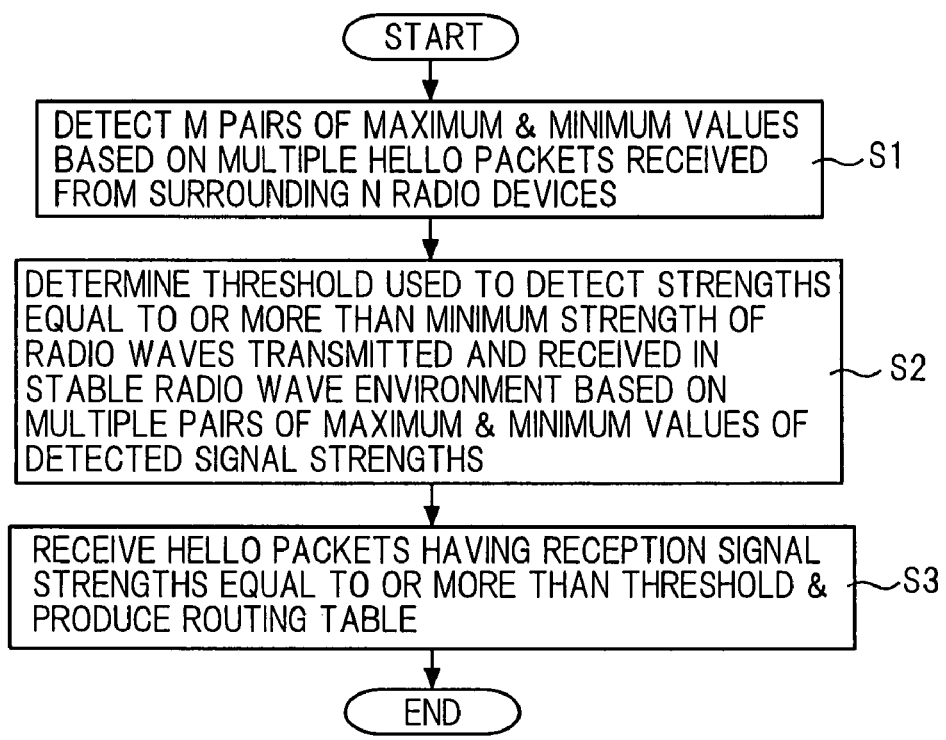
FIG. 14 is a flowchart for use in illustrating the operation of producing a routing table.

FIG. 14 is a flowchart for use in illustrating the operation of producing the routing table.

After the start of a series of operations, in the radio devices 31 to 43, the signal strength measuring module 241 of the routing daemon 24 detects m pairs of maximum and minimum values based on the plurality of reception signal strengths of a plurality of Hello packets received from surrounding n radio devices (step S1) and outputs the detected m pairs of maximum and minimum values to the threshold determining module 242.

The threshold determining module 242 sets a threshold WIth used to detect reception signal strengths equal to or more than the minimum strength of radio waves transmitted/received in a stable radio wave environment based on the m pairs of maximum and minimum values received from the signal strength measuring module 241 (step S2).

The table producing module 243 receives the threshold WIth from the threshold determining module 242, receives Hello packets having reception signal strengths equal to or more than the received threshold WIth and produces a routing table 21 according to the method described above (step S3). In this way, the series of operations ends.

Figure 15:
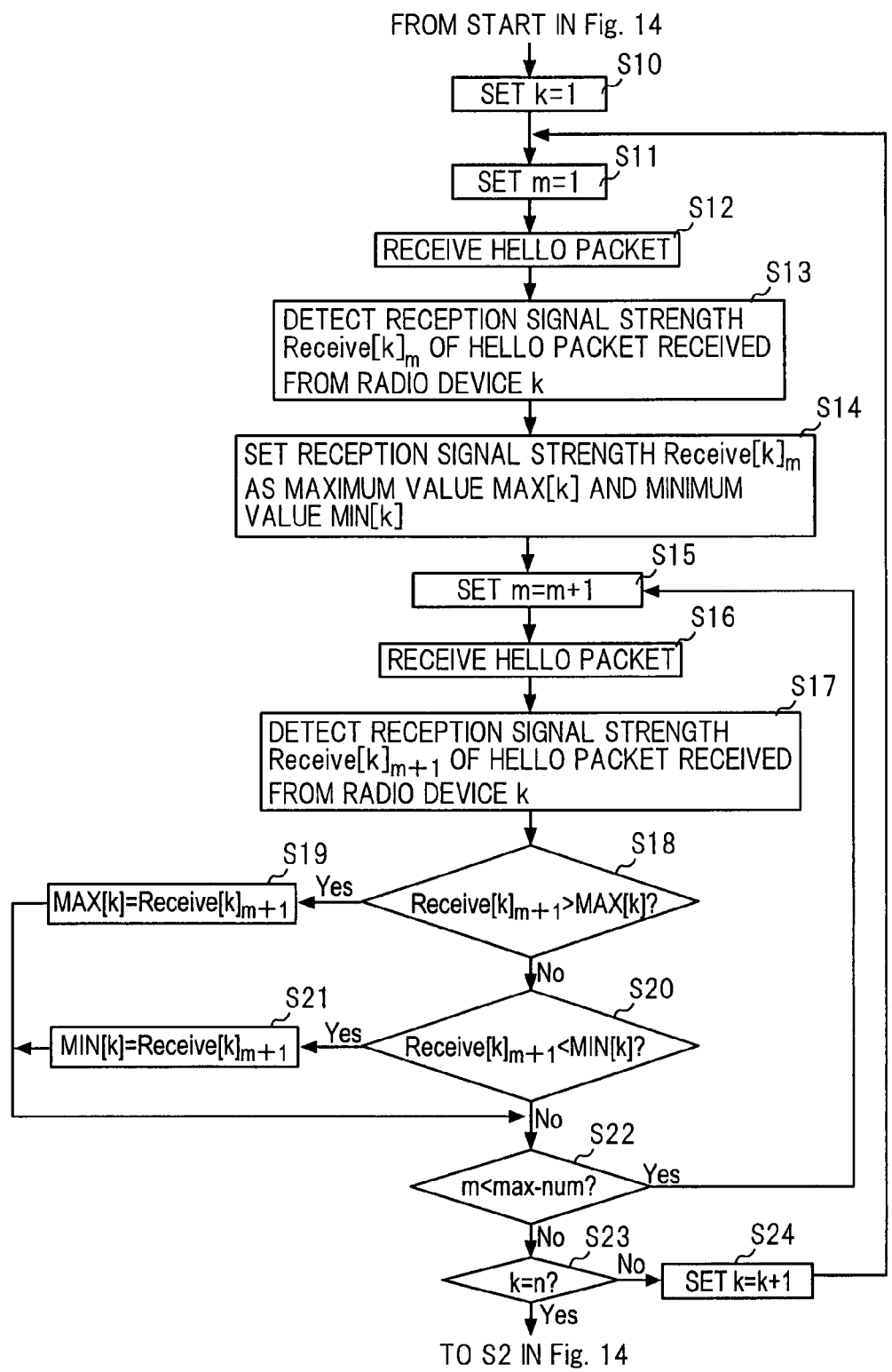
FIG. 15 is a flowchart for use in illustrating detailed operation in step S1 in FIG. 14.

FIG. 15 is a flowchart for use in illustrating detailed operation in step S1 in FIG. 14. Once the series of operations starts, the signal strength measuring module 241 sets k=1 (step S10) and m=1 (step S11), and receives a Hello packet from the UDP module 23 (step S12).

The radio interface module 16, upon receiving the Hello packet from a radio device k (k is information to identify the radio device), detects the reception signal strength Receive [k]m of the Hello packet as received, and outputs the detected strength to the signal strength measuring module 241 of the routing daemon 24.

The signal strength measuring module 241 receives the reception signal strength Receive[k]m from the radio interface module 16 and detects the reception signal strength Receive[k]m of the Hello packet received from the radio device k (step S13).

The signal strength measuring module 241 sets the detected reception signal strength Receive[k]m as the maximum value MAX[k] and the minimum value MIN[k] of the reception signal strength (step S14). More specifically, the signal strength measuring module 241 initializes the maximum value MAX[k] and the minimum value MIN[k].

Thereafter, the signal strength measuring module 241 sets m=m+1 (step S15) and receives a Hello packet (step S16). The signal strength measuring module 241 detects the reception signal strength Receive[k]m+1 of the Hello packet received in step S16 by the same operation as that in step S13 (step S17).

Then, the signal strength measuring module 241 determines whether the reception signal strength Receive[k]m+1 is larger than the maximum value MAX[k] (step S18), and sets the reception signal strength Receive[k]m+1 as the maximum value MAX[k] if the reception signal strength Receive[k]m+1 is greater than the maximum value MAX[k] (step S19).

If it is determined in step S18 that the reception signal strength Receive[k]m+1 is equal to or less than the maximum value MAX[k], the signal strength measuring module 241 further determines whether the reception signal strength Receive[k]m+1 is smaller than the minimum value MIN[k] (step S20). If the reception signal strength Receive[k]m+1 is smaller than the minimum value MIN[k], the signal strength measuring module 241 sets the reception signal strength Receive[k]m+1 as the minimum value MIN[k] (step S21).

If it is determined in step S20 that the reception signal strength Receive[k]m+1 is equal to or more than the minimum value MIN[k] or after step S19 or S21, the signal strength measuring module 241 determines whether m is smaller than max_num (step S22), and if m is smaller than max_num, the series of operations proceeds to step S15. The above-described steps S15 to S22 are repeatedly carried out until m reaches max_num in step S22.

The max_num represents the maximum number of Hello packets received during a prescribed period from one radio device, and for example, max_num is set to 30. The number 30 is based on the number of Hello packets received per minute.

Therefore, steps S15 to S22 are repeatedly carried out until it is determined in step 22 that a Hello packet has been received 30 times in a minute.

If it is determined in step S22 that the Hello packet receiving number m has reached max_num (=30), the signal strength measuring module 241 determines whether k=n (step S23), and sets k=k+1 if k is not equal to n (step S24), and then the series of operations proceeds to step S11. The above-described steps S1 to S24 are repeatedly carried out until it is determined in step S23 that k=n.

In the above, n represents the number of radio devices existing within one hop from each radio device, and more specifically, n represents the number of radio devices used to determine the above described threshold WIth. For example, n is set to "5." This is because if there are five radio devices within one hop from one radio device and the five radio devices regularly transmit Hello packets to the one radio device, the radio device can achieve the relation between the reception signal strength and the number of radio devices such as shown in FIG. 10, so that the threshold WIth can be determined highly reliably.

Then, if it is determined in step S23 that k=n, the series of operations proceeds to step S2 in FIG. 14.

In this way, according to the flowchart in FIG. 15, the signal strength measuring module 241 of one radio device sequentially receives m Hello packets from each of n radio devices existing within one hop from itself, detects pairs of maximum and minimum values MAX[k] and MIN[k] for each of the n radio devices based on the m reception signal strengths of the m Hello packets received, and outputs the detected n pairs of maximum and minimum values MAX[1] and MIN[1] to MAX[n] and MIN[n] to the threshold determining module 242.

Figure 16:
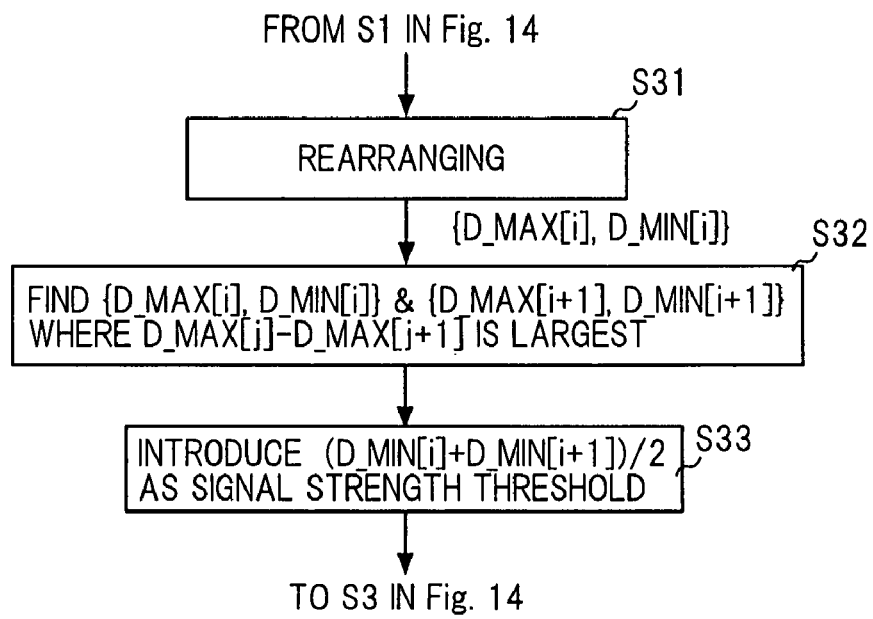
FIG. 16 is a flowchart for use in illustrating detailed operation in step S2 in FIG. 14.

FIG. 16 is a flowchart for use in illustrating detailed operation in step S2 in FIG. 14.

After the start of a series of operations, the threshold determining module 242 receives the n pairs of maximum and minimum values MAX[i] and MIN[1] to MAX[n] and MIN [n] from the signal strength measuring module 241, rearranges the n pairs of maximum and minimum values MAX[1] and MIN[1] to MAX[n] and MIN[n] so that the n maximum values MAX[1] to MAX[n] are in descending order (see FIG. 8), and sets the rearranged n pairs of maximum and minimum values as n pairs of maximum and minimum values D_MAX [1] and D_MIN[1] to D_MAX[n] and D_MIN[n] (step S31).

The threshold determining module 242 sequentially calculates the difference between two adjacent maximum values D_MAX[j]−D_MAX[j+1], and detects two pairs of maximum and minimum values {D_MAX[i], MIN[i]} and {D_MAX[i+1], MIN[i+1]} having the largest difference D_MAX[j]−D_MAX[j+1] (step S32).

Thereafter, the threshold determining module 242 calculates the average of the minimum values MIN[i] and MIN[i+ 1] (=(MIN[i]+MIN[i+1])/2) and determines the result of calculation as the threshold WIth (step S33).

The series of operations then proceeds to step S3 in FIG. 14.

In this way, each of the radio devices receives a prescribed number of Hello packets (=30) from n (n is an integer of 5 or more) radio devices existing within one hop from itself and detects a pair of maximum and minimum values MAX[k] and MIN[k] of the reception signal strengths for each of the n radio devices. Then, the radio devices each rearrange the detected n pairs of maximum and minimum values MAX[1] and MIN[1] to MAX[n] and MIN[n] so that the n maximum values MAX[1] to MAX[n] are in descending order, detects two adjacent maximum values D_MAX[i] and D_MAX[i+1] having the largest difference among the rearranged n pairs of maximum and minimum values D_MAX[i] and D_MIN[1] to D_MAX[n] and D_MIN[n], and determines the average of two minimum values D_MIN[i] and D_MIN[i+1] corresponding to the detected two maximum values D_MAX[i] and D_MAX[i+1] as the threshold WIth.

If there are five or more radio devices adjacent to each radio device, the threshold WIth can stably be determined as described above, while if the number of radio devices adjacent to each radio device is less than five, it is difficult to stably determine the threshold WIth by the above-described method.

Therefore, if the number of radio devices adjacent to each radio device is less than five, the threshold WIth is determined by the following method. The case in which only the radio device 39 is adjacent to the radio device 36 will be described as an example.

The radio device 39 sequentially switches transmission power to P (P is an integer of 5 or more) transmission power values and transmits to the radio device 36 a prescribed number (m=30) of Hello packets for a prescribed period (one minute) at each transmission power value.

The signal strength measuring module 241 of the radio device 36 detects maximum and minimum values MAX[p] and MIN[p] of the reception signal strengths in each of the transmission power values based on the m reception signal strengths of the m Hello packets received in each of the transmission power values, and outputs the detected P pairs of maximum and minimum values MAX[1] and MIN[1] to MAX[P] and MIN[P] to the threshold determining module 242.

The threshold determining module 242 rearranges the P pairs of maximum and minimum values MAX[1] and MIN[1] to MAX[P] and MIN[P] so that the P maximum values MAX [1] to MAX[P] are in descending order, and in the rearranged P pairs of maximum and minimum values D_MAX[1] and D_MIN[1] to D_MAX[P] and D_MIN[P], two adjacent maximum values D_MAX[i] and MAX[i+1] having the largest difference are detected. Then, the threshold determining module 242 determines the average of two minimum values D_MIN[i] and D_MIN[i+1] corresponding to the detected two maximum values D_MAX[i] and MAX[i+1] as the threshold WIth.

Figure 17:
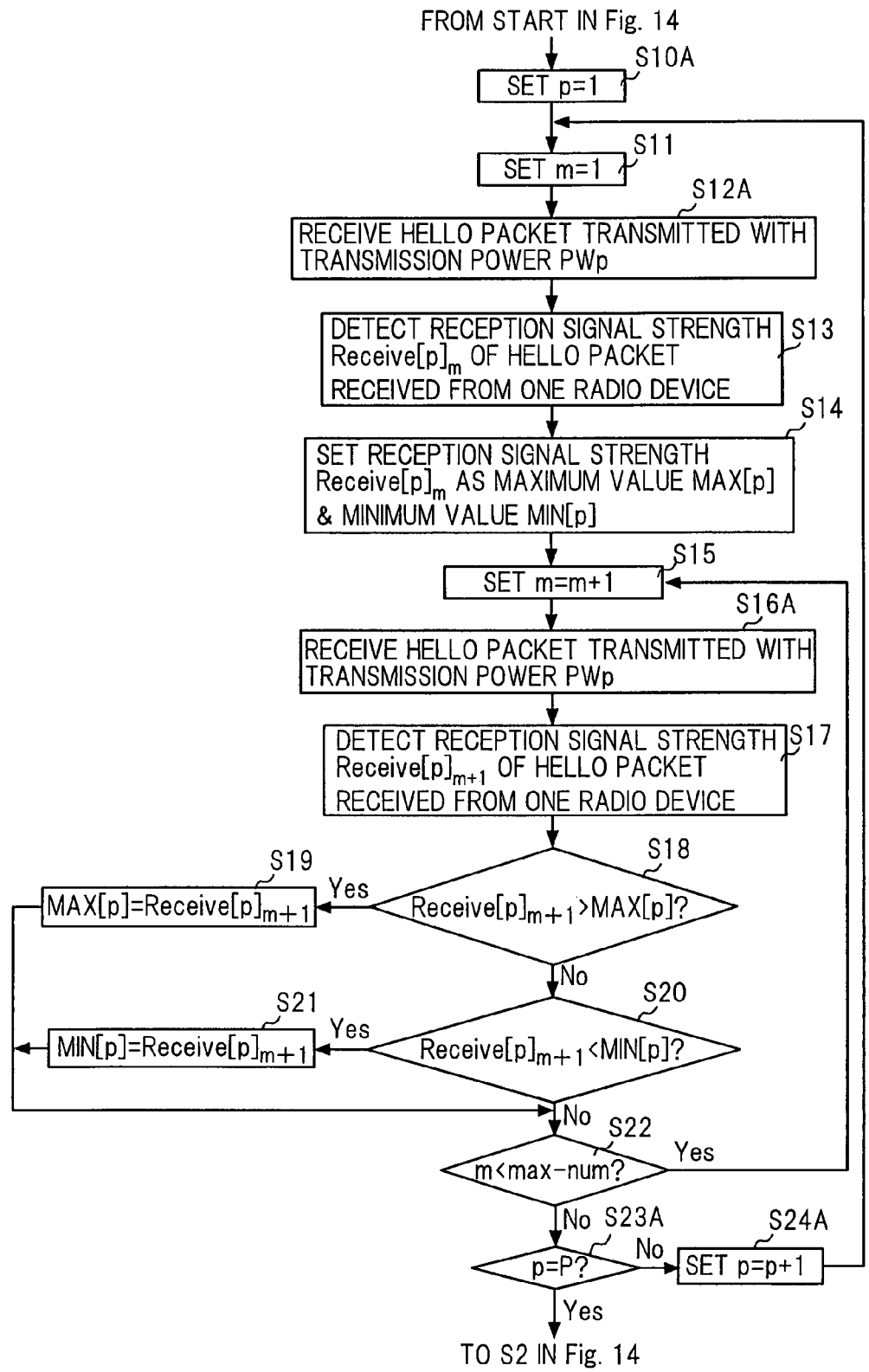
FIG. 17 is another flowchart for use in illustrating detailed operation in step S1 shown in FIG. 14.

FIG. 17 is another flowchart for use in illustrating detailed operation in step S1 in FIG. 14. The flowchart in FIG. 17 is substantially identical to the flowchart in FIG. 15 with the difference being that steps S10, S12, S16, S23, and S24 in the flowchart in FIG. 15 are replaced by steps S10A, S12A, S16A, S23A, and S24A, respectively.

After the start of the series of operations, the signal strength measuring module 241 sets p=1 (step S10A). Then, step S11 described above is carried out and then the signal strength measuring module 241 receives a Hello packet transmitted with transmission power value PWp (step S12A). Thereafter, steps S13 to S15 described above are carried out. In this case, Receive[k]m shown in steps S13 and S14 in FIG. 15 is replaced by Receive[p]m, and MAX[k] and MIN[k] shown in step S14 in FIG. 15 are replaced by MAX[p] and MIN[p], respectively.

After step S15, the signal strength measuring module 241 receives a Hello packet transmitted with transmission power PWp (step S16A). Then, steps S17 to S22 described above are carried out. In this case, Receive [k]m+1, MAX[k], and MIN [k] are replaced by Receive [p]m+1, MAX[p], and MIN[p], respectively.

If it is determined in step S22 that m has reached max_num, the signal strength measuring module 241 determines whether p=P (step S23A) and sets p=p+1 if p is not equal to P (step S24A), and then the series of operations proceeds to step S11.

Then, steps S11, S12A, S13 to S15, S16A, S17 to S22, S23A, and S24A described above are repeatedly carried out until it is determined in step S23A that p=P. More specifically, steps S11, S12A, S13 to S15, S16A, S17 to S22, S23A, and S24A described above are repeatedly carried out until the transmission power value PWp is changed into all of P values of the transmission power.

In this way, the P pairs of maximum and minimum values MAX[1] and MIN[1] to MAX[P] and MIN[P] are detected.

Then, if it is determined in step S23A that p=P, the series of operations proceeds to step S2 in FIG. 14 and the threshold WIth is determined based on the P pairs of maximum and minimum values MAX[1] and MIN[1] to MAX[P] and MIN [P] according to the flowchart in FIG. 16.

In this way, the radio devices each receive a prescribed number (m=30) of Hello packets at each transmission power PW from one radio device existing within one hop from itself while changing the transmission power PW to P power values and detects a pair of maximum and minimum values MAX[p] and MIN[p] of the reception signal strengths for each of the P parts of the transmission power PW The radio devices each rearrange the detected P pairs of maximum and minimum values MAX[1] and MIN[1] to MAX[P] and MIN[P] so that the P maximum values MAX[1] to MAX[P] are in descending order and detects two adjacent maximum values D_MAX [i] and D_MAX[i+1] having the largest difference in the rearranged P pairs of maximum and minimum values D_MAX[1] and D_MIN[1] to D_MAX[P] and D_MIN[P]. Then, the average of the two minimum values D_MIN[i] and D_MIN[i+1] corresponding to the two detected maximum values D_MAX[i] and D_MAX[i+1] is determined as the threshold WIth.

As in the foregoing, according to the invention, using Hello packets regularly broadcast from the radio devices 31 to 43 of the radio network system 100, the maximum and minimum reception signal strengths MAX[k] and MIN[k] (or MAX[p] and MIN[p]) of the Hello packets received from the radio devices can be detected.

Therefore, each of the radio devices can receive only Hello packets transmitted/received in a stable radio wave environment through normal operation in the ad hoc network and can produce a stable routing table 21 based on the received Hello packets. Consequently, stable routing is enabled.

As described above, if the number of radio devices adjacent to each radio device is five or more, the pairs of maximum and minimum values MAX[k] and MIN[k] of the reception signal strengths of Hello packets received from one radio device are detected for each of the five or more radio devices and the threshold WIth is determined based on the detected five or more pairs of minimum and maximum values MAX[k] and MIN[k]. If the number of radio devices adjacent to each radio device is less than five, the maximum and minimum values MAX[p] and MIN[p] of the reception signal strengths of Hello packets received from one radio device are detected for each of five or more transmission power values, and the threshold WIth is determined based on the detected five or more pairs of maximum and minimum values MAX[p] and MIN[p].

Therefore, according to the invention, the number of radio devices that transmit Hello packets is counted and the threshold WIth may be determined by one of the above two methods depending on the count result.

Figure 18:
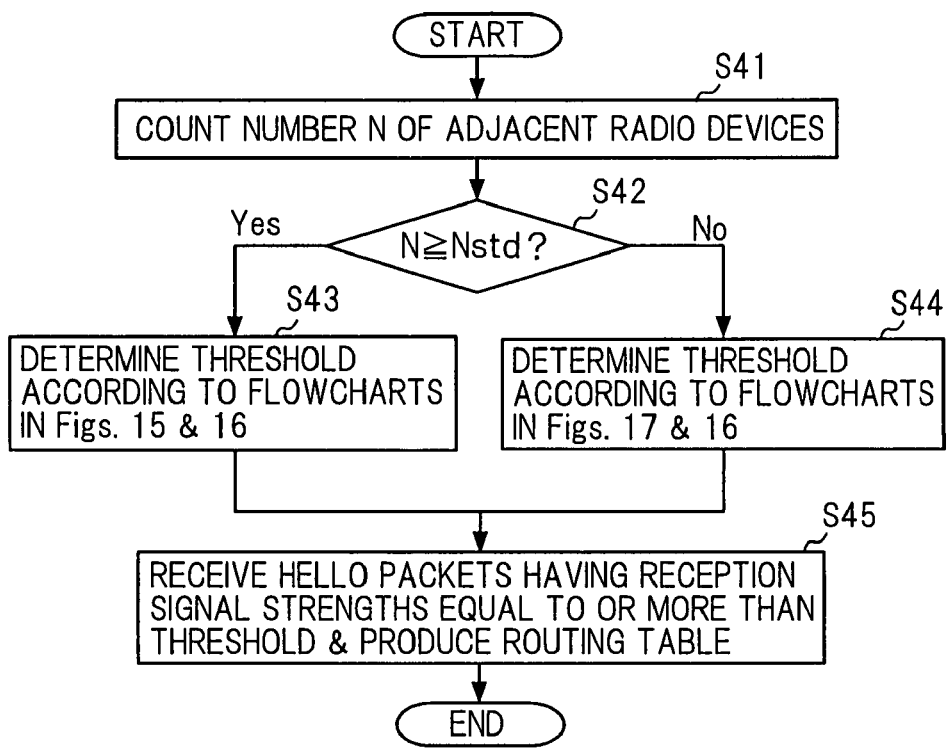
FIG. 18 is another flowchart for use in illustrating the operation of producing a routing table.

FIG. 18 is another flowchart for use in illustrating the operation of producing a routing table. After the start of the series of operations, the signal strength measuring module 241 of each of the radio devices 31 to 43 counts the number N (N is a positive integer) of adjacent radio devices based on the source addresses of broadcast Hello packets (step S41) and determines whether the counted number N is equal to or more than a standard value Nstd (such as five)(step S42).

If the number N of the adjacent radio devices is equal to or more than the standard value Nstd, the signal strength measuring module 241 detects n pairs of maximum and minimum values MAX[k] and MIN[k] according to the flowchart in FIG. 15 and outputs the detected n pairs of maximum and minimum values MAX[k] and MIN[k] to the threshold determining module 242.

The threshold determining module 242 determines a threshold WIth according to the flowchart shown in FIG. 16 based on the n pairs of maximum and minimum values MAX [k] and MIN[k] received from the signal strength measuring module 241 and outputs the determined threshold WIth to the table producing module 243 (step S43).

If it is determined in step S42 that the number N of the adjacent radio devices is less than the standard value Nstd, the signal strength measuring module 241 detects P pairs of maximum and minimum values MAX[p] and MIN[p] according to the flowchart in FIG. 17 and outputs the detected P pairs of maximum and minimum values MAX[p] and MIN [p] to the threshold determining module 242.

The threshold determining module 242 determines a threshold WIth according to the flowchart in FIG. 16 based on the P pairs of maximum and minimum values MAX[p] and MIN[p] received from the signal strength measuring module 241 and outputs the determined threshold WIth to the table producing module 243 (step S44).

After step S43 or S44, the table producing module 243 receives Hello packets having reception signal strengths equal to or more than the threshold WIth received from the threshold determining module 242 and produces a routing table 21 according to the above-described method (step S45). In this way, the series of operations ends.

As in the foregoing, according to the flowchart in FIG. 18, regardless of the number of adjacent radio devices, a threshold WIth can be determined and a stable routing table 21 can be produced based on the determined threshold WIth. Consequently, stable routing can be carried out.

Figure 19:
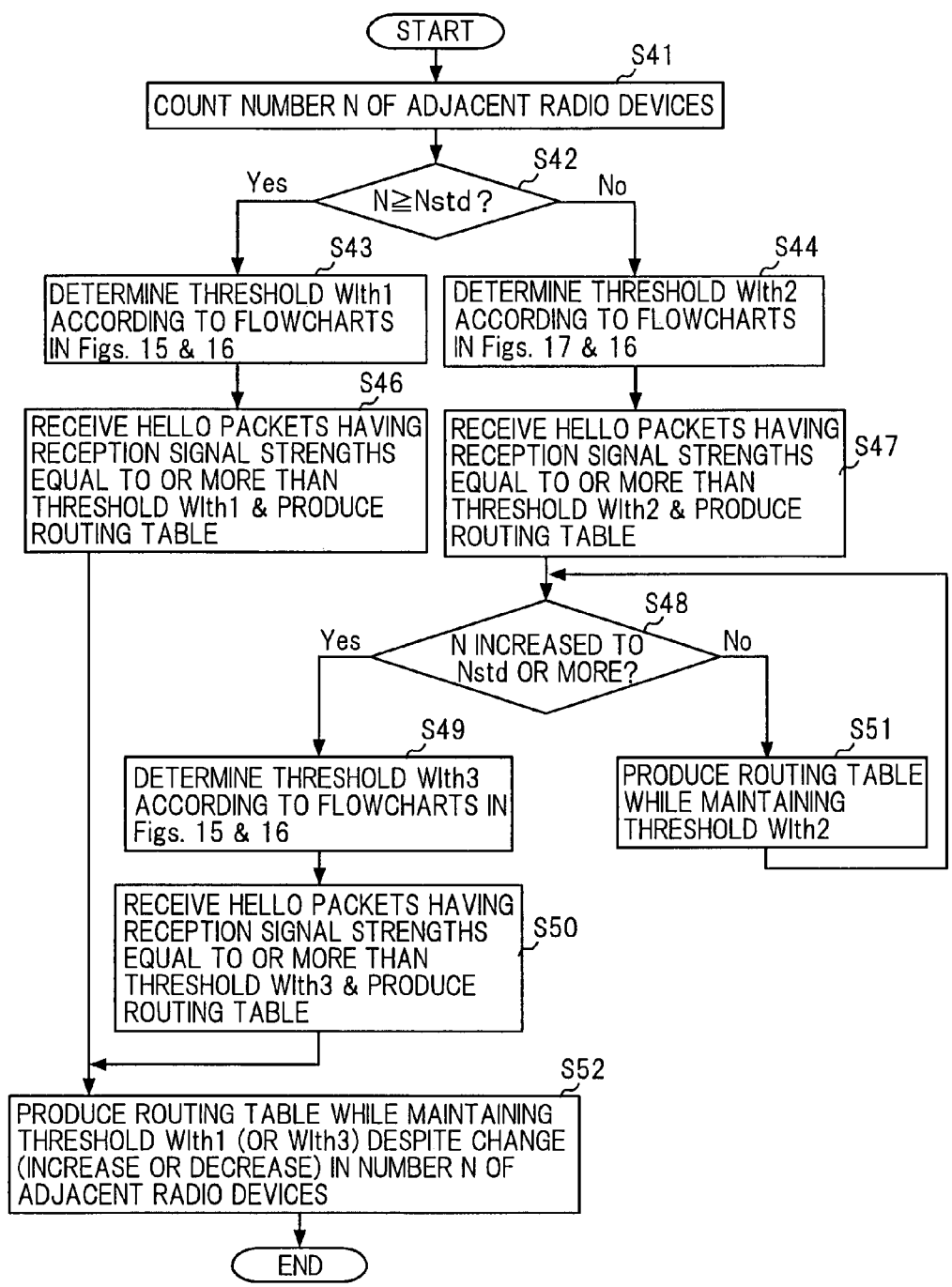
FIG. 19 is another flowchart for use in illustrating the operation of producing a routing table.

FIG. 19 is another flowchart for use in illustrating the operation of producing a routing table. According to the invention, the routing table 21 may be produced according to the flowchart shown in FIG. 19.

The flowchart in FIG. 19 is removed of step S45 in the flowchart in FIG. 18 and additionally provided with steps S46 to S52, and the other parts is the same as that in the flowchart in FIG. 18. Note that in the flowchart in FIG. 19, a threshold WIth1 is determined in step S43 and a threshold WIth2 is determined in step S44.

After step S43, the table producing module 243 in each of the radio devices 31 to 43 receives Hello packets having reception signal strengths equal to or more than the threshold WIth1 and produces a routing table 21 (step S46).

After step S44, the table producing module 243 in each of the radio devices 31 to 43 receives Hello packets having reception signal strengths equal to or more than the threshold WIth2 and produces a routing table 21 (step S47). The signal strength measuring module 241 in each of the radio devices 31 to 43 determines whether the number N of adjacent radio devices has increased to a number equal to or more than the standard value Nstd (step S48) and if the number N has increased to the standard value Nstd or more, n pairs of maximum and minimum values MAX[k] and MIN[k] are detected according to the flowchart in FIG. 15 and a threshold WIth3 is determined by threshold determining module 242 according to the flowchart in FIG. 16 based on the n pairs of maximum and minimum values MAX[k] and MIN[k] (step S49).

Thereafter, the table producing module 243 receives Hello packets having reception signal strengths equal to or more than the threshold WIth3 and produces a routing table 21 (step S50).

If it is determined in step S48 that the number N is yet to reach the standard value Nstd, the table producing module 243 maintains the threshold WIth2 and produces a routing table 21 (step S51). Then, the series of operations proceeds to step S48.

After step S46 or S50, the table producing module 243 in each of the radio devices 31 to 43 maintains the threshold WIth1 (or WIth3) even if the number N of adjacent radio devices changes (increases or decreases) and produces a routing table 21 (step S52). In this way, the series of operations ends.

In the flowchart in FIG. 19, as long as the number N of adjacent radio devices is equal to or more than the standard value Nstd, a routing table 21 is produced based on the initially determined threshold WIth1 even if the number N changes thereafter (see "Yes" in step S42, steps S43, S46, and S52), and if the number N of adjacent radio devices does not reach the standard value Nstd to start with, the transmission power is changed and the threshold WIth2 is determined (see "No" in step S42 and step S44). If the number N of adjacent radio devices increases to the standard value Nstd or more, the threshold WIth1 is determined again and the threshold WIth1 is updated by the determined threshold WIth3. Thereafter, the threshold WIth3 is maintained and a routing table 21 is produced (see steps S47 to S52).

More specifically, according to the invention, if the number N of adjacent radio devices increases to the standard value Nstd or more, the threshold WIth is updated and otherwise the threshold WIth is not updated.

Note that in the flowchart in FIG. 19, the threshold WIth may be updated if the number N of adjacent radio devices increased by a prescribed number. In this case, it is determined in step S48 in FIG. 19 whether the number N of adjacent radio devices has increased by the prescribed number and the other parts is the same as that in the flowchart in FIG. 19.

Figure 20:
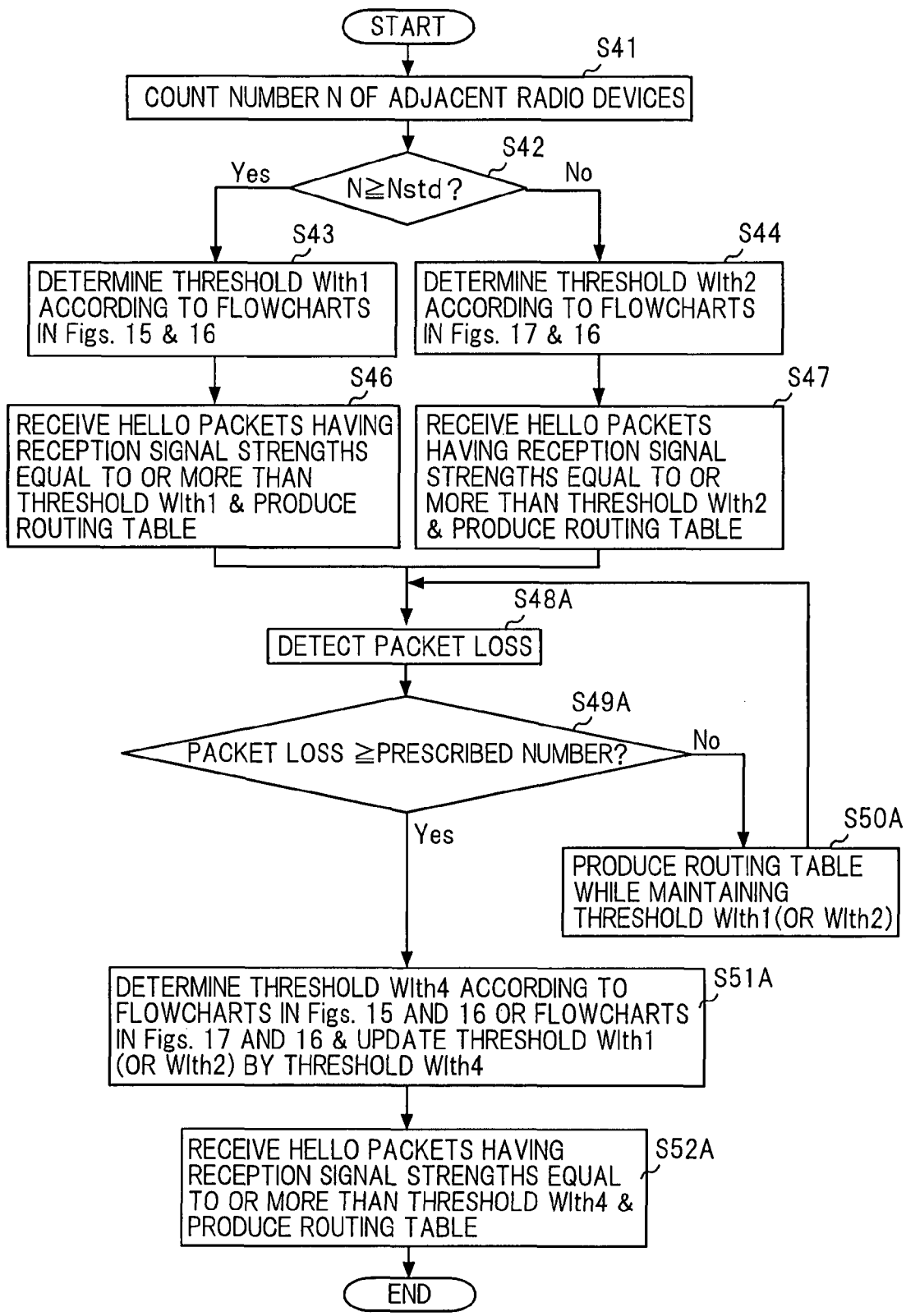
FIG. 20 is another flowchart for use in illustrating the operation of producing a routing table.

FIG. 20 is another flowchart for use in illustrating the operation of producing a routing table. According to the invention, the routing table 21 may be produced according to the flowchart shown in FIG. 20.

The flowchart shown in FIG. 20 is identical to the flowchart in FIG. 19 with the difference being that steps S48 to S52 in the flowchart in FIG. 19 are replaced by steps S48A to S52A and the other parts is the same as that in the flowchart in FIG. 19.

After step S46 or S47, the signal strength measuring module 241 detects packet loss (step S48A). More specifically, the signal strength measuring module 241 detects packet loss using that a prescribed number of packets are not received within a prescribed period.

The signal strength measuring module 241 determines whether the detected packet loss is equal to or more than a prescribed number (step S49A). If the packet loss is less than the prescribed number, the table producing module 243 maintains the threshold WIth1 or WIth2 and produces a routing table 21 (step S50A). Thereafter, the series of operations proceeds to step S48A.

If it is determined in step S49A that the packet loss is equal to or more than the prescribed number, the signal strength measuring module 241 and the threshold determining module 242 determine a threshold WIth4 according to the flowcharts in FIGS. 15 and 16 or the flowcharts in FIGS. 17 and 16, and the threshold WIth1 or WIth2 is updated by the threshold WIth4 (step S51A).

Thereafter, the table producing module 243 receives Hello packets having reception signal strengths equal to or more than the threshold WIth4 and produces a routing table 21 (step S52A). In this way, the series of operations ends.

In the flowchart in FIG. 20, if the packet loss is equal to or more than the prescribed number, the threshold WIth is updated and otherwise the threshold WIth is not updated. If the packet loss is the prescribed number or more, it is highly likely that the radio wave environment is unstable, so that the threshold WIth is updated.

Figure 21:
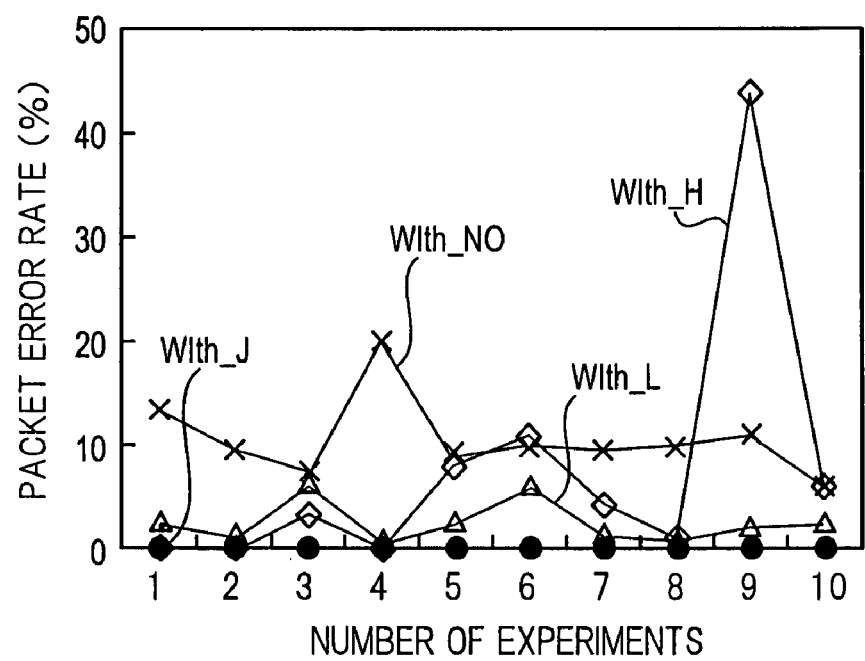
FIG. 21 shows the relation between the packet error rate and the number of experiments.

FIG. 21 shows the relation between the packet error rate and the number of experiments. In FIG. 21, the ordinate represents the packet error rate and the abscissa represents the number of experiments. The thresholds WIth_H, WIth_L, and WIth_J are denoted by WIth_H, WIth_L, and WIth_J in FIG. 10, the threshold WIth_H is a threshold that is too high, the threshold WIth_L is a threshold that is too low, and the threshold WIth_J is a threshold according to the invention. What is denoted by WIth_NO corresponds to the case in which no threshold was set.

As can be clearly understood from FIG. 21, when the threshold WIth_J determined according to the invention was used, the packet error rate continued to be zero until the tenth experiment. When however the threshold WIth was too high or too low and no threshold WIth was set, the packet error rate greatly changed with the number of experiments. More specifically, if the threshold WIth is too high or too low and no threshold WIth is set, the routing table 21 is frequently rewritten and loops occur in the radio network system 100, so that the arriving sequence of packets is greatly changed, and the packet error rate increases.

Therefore, it was established based on the experiments that a stable routing table 21 could be produced and stable routing could be carried out by determining the threshold WIth by the methods according to the invention.

A stable routing table 21 can be produced by introducing the threshold WIth. However, if the configuration of the radio devices 31 to 43 in the radio network system 100 is in a state of imbalance, the radio devices located far from the other devices will be excluded from the radio network system 100.

Figure 22:
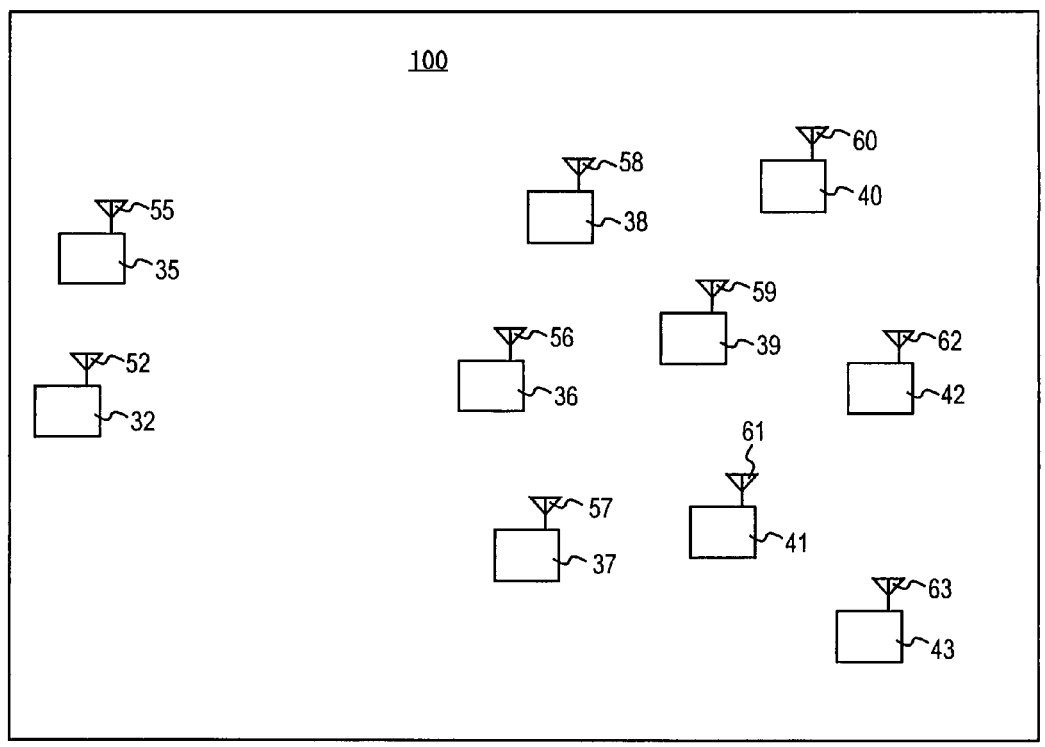
FIG. 22 shows the concept of a network configuration where the configuration of radio devices is in a state of imbalance.

FIG. 22 shows a concept of network configuration in which the configuration of radio devices is in a state of imbalance. The radio devices 32 and 35 are located far from the radio devices 36 to 43. In such an environment, the radio device 32 determines a threshold WIth(32) by the method described above according to a plurality of reception signal strengths of Hello packets received from the radio devices 35 to 38. In this case, the distance between the radio device 32 and the radio device 35 is less than that between the radio device 32 and the radio devices 36, 37 and 38, and the determining of threshold WIth(32) is greatly influenced by the reception signal strength Receive[35] of the Hello packet received from the radio device 35. That is to say, a value closer to the reception signal strength Receive[35] is determined as the threshold WIth(32).

Therefore, the reception signal strengths Receive[36] to Receive[38] of Hello packets received by the radio device 32 from the radio devices 36 to 38 are lower than the threshold WIth(32), and the table producing module 243 of the radio device 32 removes the radio devices 36 to 38 from the neighbor list and deletes the routing information of routes passing through the radio devices 36 to 38 from the routing table 21.

Consequently, the radio devices 32 and 35 carry out no radio communication between the radio device 36 to 43, which results in isolation of the radio devices 32 and 35 in the radio network system 100.

Therefore, a method of preventing isolated radio devices as described above will be described below.

FIG. 23 shows neighbor lists, a routing table and a Hello packet. The table producing module 243 of the radio device 32 produces and maintains the neighbor list 10H if the threshold WIth(32) is not introduced. Then, the table producing module 243 of the radio device 32 determines, based on the neighbor list 10H, whether the number of radio devices adjacent to the radio device 32 is less than a standard value (such as five) when the threshold WIth(32) is introduced.

In this case, the reception signal strengths Receive [36] to Receive [38] of Hello packets received by the radio device 32 from the radio devices 36 to 38 are lower than the threshold WIth(32), while the reception signal strength Receive[35] of a Hello packet received by the radio device 32 from the radio device 35 is more than the threshold WIth(32). Therefore, the table producing module 243 of the radio device 32 counts the number of adjacent radio devices when the threshold WIth (32) is introduced as "1" and determines that the number of adjacent radio devices is less than the standard value (see (a) in FIG. 23).

Then, the table producing module 243 of the radio device 32 produces the neighbor list 10H without introducing the threshold WIth(32), maintains in the routing table 21B the routing information of routes passing through the radio devices 36 to 38 based on the produced neighbor list 10H, and stores "1" for the flag in the routing information of routes passing through the radio devices 36 to 38 (see (b) in FIG. 23).

When the routing information is maintained without introducing the threshold WIth(32), the threshold WIth(32) is not determined at the radio device 32. Therefore, the table producing module 243 of the radio device 32 produces a Hello packet HLP1 including a flag showing that the threshold WIth(32) was not determined, and transmits the Hello packet HLP1 to the radio devices 35 to 38. In this case, the Hello packet HLP1 includes the IP address IPaddress32 of the radio device 32 and a flag "1" showing that the threshold WIth(32) was not determined (see (c) in FIG. 23).

The table producing module 243 of the radio device 36 receives the Hello packet HLP1 from the radio device 32 and detects the IP address IPaddress32 of the radio device 32, which has transmitted the Hello packet HLP1, and the flag "1" from the Hello packet HLP1. Then, the table producing module 243 of the radio device 36 detects that the threshold WIth(32) was not determined at the radio device 32, unconditionally stores the radio device 32 in the neighbor list, and produces the neighbor list 10J (see (d) in FIG. 23). The table producing module 243 of the radio device 36 then maintains in the routing table 21, based on the produced neighbor list 10J, the routing information of routes passing through the radio device 32. Similarly, the table producing module 243 of the radio devices 37 and 38 maintains in the routing table 21 the routing information of routes passing through the radio device 32.

In this way, the table producing module 243 of the radio device 32 stores the radio devices 36 to 38 in the neighbor list 10H without introducing the threshold WIth(32) and maintains in the routing table 21 the routing information of routes passing through the radio devices 36 to 38, and the table producing module 243 of the radio devices 36 to 38 unconditionally stores the radio device 32 in the neighbor list 10J and maintains in the routing table 21 the routing information of routes passing through the radio device 32.

Therefore, according to the invention, isolation of the radio devices 32 and 35 in the radio network system 100 can be prevented.

FIG. 24 shows other neighbor lists. Suppose, in the topology shown in FIG. 22, the radio device 32 is adjacent to the radio devices 35 and 36. In this case, the table producing module 243 of the radio device 32 produces the neighbor list 10K and a hello packet including the produced neighbor list 10K, and transmits the Hello packet to the radio devices 35 and 36.

The table producing module 243 of the radio device 36 receives the Hello packet including the neighbor list 10K from the radio device 32 and reads out the neighbor list 10K. Then, the table producing module 243 of the radio device 36 determines whether the number of adjacent radio devices stored in the neighbor list 10K is less than a standard value (such as three). If the number of adjacent radio devices is less than the standard value, the table producing module 243 of the radio device 36 unconditionally stores the radio device 32 in the neighbor list of the radio device 36 itself. If the number of adjacent radio devices is equal to or more than the standard value, the table producing module 243 of the radio device 36 determines whether to store the radio device 32 in the neighbor list of the radio device 36 itself by introducing the threshold WIth.

In this case, since the neighbor list 10K includes two adjacent radio devices (see (a) in FIG. 24), the table producing module 243 of the radio device 36 determines that the number of adjacent radio devices is less than the standard value, and therefore, unconditionally stores the radio device 32 in the neighbor list of the radio device 36 itself and produces the neighbor list 10L (see (b) in FIG. 24). Then, the table producing module 243 of the radio device 36 maintains the routing information of routes passing through the radio device 32 in the routing table 21 according to the produced neighbor list 10L.

In this way, according to the present invention, if the number of adjacent radio devices stored in neighbor lists received from other radio devices is less than the standard value, routing information of routes passing through the radio devices which transmitted the neighbor lists may be maintained in the routing table 21 by unconditionally storing in the neighbor list the other radio devices which transmitted the neighbor lists.

According to the invention, a packet error rate PER may be measured to maintain routes when the packet error rate PER is lower than a threshold PER_th, even if the reception signal strength is lower than the threshold WIth.

For example, in the topology shown in FIG. 22, the IP module 20 of the radio device 36 calculates the packet error rate PER of a packet received from the radio device 32 and outputs the calculated packet error rate PER[32] to the table producing module 243 of the routing daemon 24. Then, the table producing module 243 of the radio device 36 stores the radio device 32 in the neighbor list of the radio device 36 itself and maintains the routing information of routes passing through the radio device 32 if the packet error rate PER[32] is lower than the threshold PER_th, even if the reception signal strength Receive[32] of the Hello packet received from the radio device 32 is lower than the threshold WIth[36].

Figure 25:
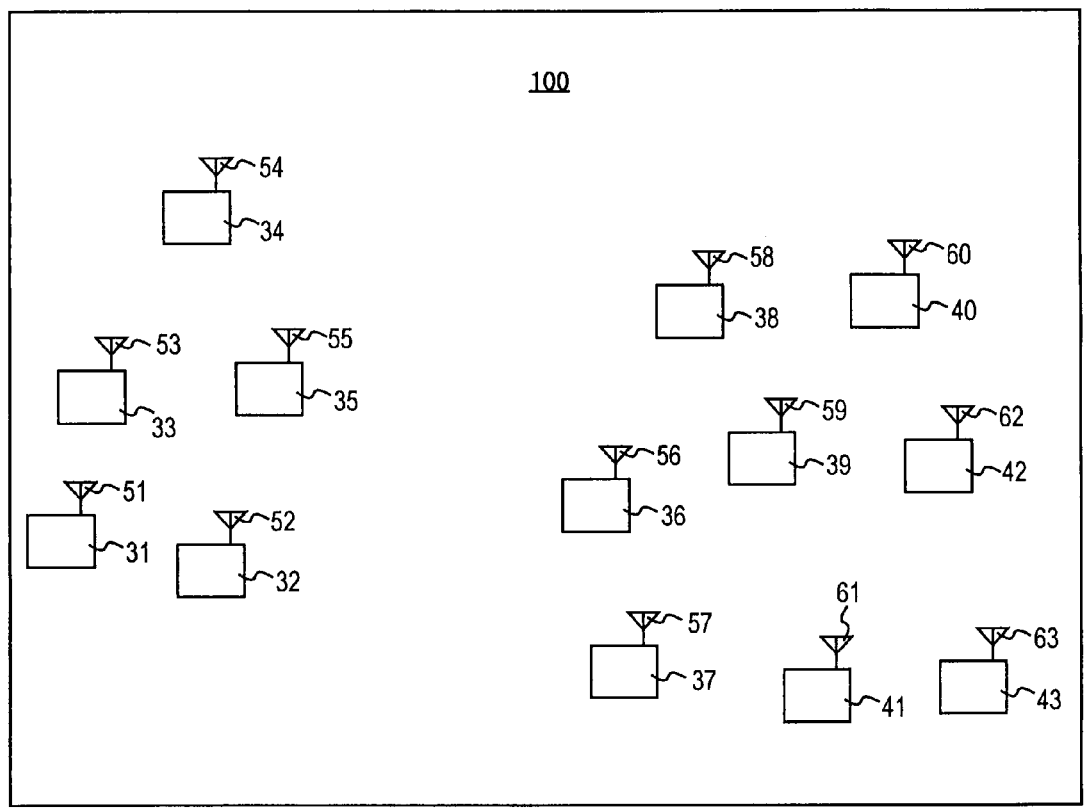
FIG. 25 shows the concept of another network configuration where the configuration of radio devices is in a state of imbalance.

Now, a case with another type of imbalance which is different from the imbalance shown in FIG. 22 will be described. FIG. 25 shows a concept of another network configuration in which the configuration of radio devices is in a state of imbalance. The radio devices 31 to 35 are located far from the radio devices 36 to 43.

In such an environment, the radio device 35 determines the threshold WIth(35) by the method described above according to the plurality of reception signal strengths of Hello packets received from the radio devices 31 to 34 and 36 to 38. In this case, since the distance between the radio device 35 and the radio devices 31 to 34 is less than the distance between the radio device 35 and the radio devices 36 to 38, the determining of the threshold WIth(35) is greatly influenced by the reception signal strengths Receive[31], Receive[32], Receive [33], and Receive[34] of Hello packets received from the radio devices 31 to 34. That is to say, a value close to the reception signal strengths Receive[31], Receive[32], Receive [33], and Receive[34] is determined as the threshold WIth (35).

Then, the reception signal strengths Receive[36] to Receive[38] of the Hello packets received by the radio device 35 from the radio devices 36 to 38 is lower than the threshold WIth(35), and therefore, the table producing module 243 of the radio device 35 does not store the radio devices 36 to 38 in the neighbor list nor does it store the routing information of routes passing through the radio devices 36 to 38 in the routing table 21.

Consequently, no radio communication is carried out between the radio devices 31 to 35 and the radio devices 36 to 43, and therefore, the radio devices 31 to 35 will be isolated in the radio network system 100.

In order to prevent the radio devices 31 to 35 from being isolated in the radio network system 100, the radio device 35 compares its neighbor list to the neighbor lists received from the other radio devices. If the number of radio devices that are different from ones stored in the neighbor lists of other radio devices is equal to or more than the standard value (=80% to 90%), the radio device 35 then produces a neighbor list without introducing the threshold WIth and stores the routing information in the routing table 21 according to the produced neighbor list.

This will be described more specifically. FIG. 26 shows other neighbor lists and another routing table. The table producing module 243 of the radio device 35 produces the neighbor list 10M (see (a) in FIG. 26) of the radio device 35 and receives a Hello packet including the neighbor list 10N (see (b) in FIG. 26) from the radio device 36. Then, the table producing module 243 of the radio device 35 reads out the neighbor list 10N from the received Hello packet and counts the number of radio devices which are stored in the neighbor list 10M but not in the neighbor list 10N. In the case shown in FIG. 26, all of the four radio devices 31 to 34 stored in the neighbor list 10M are different from the radio devices 37 to 39, and 41 stored in the neighbor list 10N. Therefore, the table producing module 243 of the radio device 35 determines that among the four radio devices 31 to 34 stored in the neighbor list 10M, 100% (=4/4×100) of them are different from the radio devices 37 to 39, and 41 stored in the neighbor list 10N and stores the radio device 36 in the neighbor list 10M without introducing the threshold WIth(35). The table producing module 243 of the radio device 35 then updates the neighbor list 10M by the neighbor list 10P (see (c) in FIG. 26) and produces the routing table 21C (see (d) in FIG. 26) based on the updated neighbor list 10P. In this case, the table producing module 243 of the radio device 35 sets the flag to "1" showing that the routes passing through the radio device 36 were stored without introducing the threshold WIth(35).

The table producing module 243 of the radio device 35 produces a Hello packet HLP2=[IPaddress35/1] which has the same structure as the Hello packet HLP1 shown in (c) in FIG. 23 and transmits the produced Hello packet HLP2 to other radio devices in order to inform the other radio devices that the threshold WIth(35) was not determined in the radio device 35.

The table producing module 243 of the radio device 36 receives the Hello packet HLP2 from the radio device 35 and detects, in the received Hello packet HLP2, the flag "1" showing that the threshold WIth(35) was not determined in the radio device 35. Then, the table producing module 243 of the radio device 36 stores the radio device 35 in the neighbor list of the radio device 36 itself and stores, in the routing table 21, the routing information of the routes passing through the radio device 35 based on the neighbor list in which the radio device 35 was stored.

In this way, the routes between the radio devices 35 and 36 are maintained, and the radio devices 31 to 35 are kept from being isolated in the radio network system 100.

Note that the standard value (=80 to 90%) for the number of different radio devices may not be fixed and, for example, may vary according to the number of adjacent radio devices. That is to say, if the number of adjacent radio devices relatively increases, the standard value (=80 to 90%) for the number of different radio devices is set to a relatively low value, and if the number of adjacent radio devices relatively decreases, the standard value (=80 to 90%) for the number of different radio devices is set to a relatively high value.

In the topologies shown in FIGS. 22 and 25, the threshold determining module 242 of each of the radio devices 31 to 43 determines that the topology has changed and redetermines a threshold if the number of adjacent radio devices increases by numbers equal to or more than a prescribed number, if the radio devices stored in the neighbor list have been changed by numbers equal to or more than a prescribed number, or if the packet error rates from each radio device have changed by rate equal to or more than the threshold.

As described above, the table producing module 243 of each of the radio devices 31 to 43 stores, by various methods, each radio device in the neighbor list without introducing the threshold WIth and maintains/stores the routing information of each route in the routing table 21 based on the neighbor list in which each radio device is stored. Then, if the routing information was maintained/stored without introducing the threshold WIth, the table producing module 243 of each of the radio devices 31 to 43 sets in the routing table 21 the flag to "1" showing that the routing formation was maintained/stored without introducing the threshold WIth. Therefore, the IP module 20 of each of the radio devices 31 to 43 carries out radio communication between each destination excluding the routes with which the flags are set to "1".

The reason why routing information is maintained/stored without introducing the threshold WIth is to prevent isolated radio devices in the radio network system 100, but the routing information maintained/stored without introducing the threshold WIth actually has a poor communication quality. Therefore, transmission/reception of controlling data (Hello packets, for example) is continued to keep connection, however, the routing information maintained/stored without introducing the threshold WIth is not selected as a radio communication route.

In the foregoing description, it is described that if there is imbalanced configuration of radio devices as shown in FIGS. 22 and 25, routing information is maintained/stored in the routing table 21 without introducing the threshold WIth, however, if there is imbalanced configuration of radio devices as shown in FIGS. 22 and 25, there is an imbalance between strengths of radio waves in a radio communication space. Therefore, generally, the invention may only have to maintain/store in the routing table 21 routing information without introducing the threshold WIth if there is an imbalance between strengths of radio waves in a radio communication space.

FIG. 27 is a flowchart for use in illustrating the operation of preventing isolated radio devices in the radio network system 100. The flowchart in FIG. 27 will be described with the case in which the routes from the radio device 32 to the radio device 36 are maintained/stored.

Once the series of operations starts, the table producing module 243 of the radio device 32 determines the threshold WIth by the operation described above (step S61) and determines whether there is an imbalance between strengths of radio waves in the radio communication space by the various methods described above (step S62).

Then, if it is determined that there is an imbalance between strengths of radio waves (for example, if the reception signal strengths of Hello packets received from the radio device 36 are lower than the threshold WIth, and if the number of radio devices adjacent to the radio device 32 is less than the standard value), the table producing module 243 of the radio device 32 maintains/stores in the routing table 21 the routing information of routes passing through the radio device 36 without introducing the threshold WIth determined in step S61 (step S63).

Then, the table producing module 243 of the radio device 32 produces a Hello packet including an urgent flag showing that the threshold WIth was not determined and transmits the Hello packet to other radio devices (step S64).

Upon receiving the Hello packet including the urgent flag, the radio device 36 maintains/stores in the routing table 21 the routes passing through the radio device 32 which has transmitted the Hello packet including the urgent flag (step S65).

Thereafter, the IP module 20 of the radio devices 32 and 36 carries out radio communication excluding the routes maintained/stored in the routing table 21 without introducing the threshold WIth.

Meanwhile, in step S62, if it is determined that there is no imbalance between strengths of radio waves, the table producing module 243 of the radio device 32 maintains/stores in the routing table 21 the routing information by introducing the threshold WIth (step S67).

After step S66 or S67, the series of operations ends.

In the foregoing description, the n pairs of maximum and minimum values MAX[1] and MIN[1] to MAX[n] and MIN[n] (or the P pairs of maximum and minimum values MAX[1] and MIN[1] to MAX[P] and MIN[P]) are rearranged so that the n maximum values MAX[1] to MAX[n] (or the P maximum values MAX[1] to MAX[P]) are arranged in descending order, while the invention is not limited to the arrangement. The n pairs of maximum and minimum values MAX[1] and MIN[1] to MAX[n] and MIN[n] (or the P pairs of maximum and minimum values MAX[1] and MIN[1] to MAX[P] and MIN[P]) may be rearranged so that n maximum values MAX[1] to MAX[n] (or the P maximum values MAX[1] to MAX[P]) are arranged in ascending order, and two pairs of maximum and minimum values D_MAX[1] and D_MIN[i]; D_MAX[i+1] and D_MIN[i+1] in which the two adjacent maximum values have the largest difference are detected among the rearranged n pairs of maximum and minimum values D_MAX[1] and D_MIN[1] to D_MAX[n] and D_MIN[n], and the average of the two minimum values D_MIN[i] and D_MIN[i+1] included in the detected two pairs of maximum and minimum values D_MAX[i] and D_MIN[i];(D_MAX[i+1] and D_MIN[i+1], in other words, ((D_MIN[i]+D_MIN[i+1])/2) may be determined as the threshold WIth.

In the foregoing description, the average of the two minimum values D_MIN[i] and D_MIN[i+1], in other words, ((D_MIN[i]+D_MIN[i+1])/2) is determined as the threshold WIth, while the invention is not limited to the arrangement, and a weighted average of the two minimum values D_MIN[i] and D_MIN[i+1] may be determined as the threshold WIth.

In this case, the weighted average is calculated by the following expression:

$$(\alpha \times (D\_MIN[i]) + (1-\alpha) \times (D\_MIN[i+1]))/2 \quad (1)$$

In the expression (1), $\alpha$ is a real number in the range represented by $0 \leq \alpha \leq 1$.

When the n maximum values D_MAX[1] to D_MAX[n] or the P maximum values D_MAX[1] to D_MAX[P] are arranged in descending order, $\alpha$ is set to relatively larger values as the difference between the D_MIN[i] and D_MIN[i+1] (=D_MIN[i]-D_MIN[i+1]) relatively increases, and set to relatively smaller values as the difference (=D_MIN[i]-D_MIN[i+1]) relatively decreases.

When the difference (=D_MIN[i]-D_MIN[i+1]) relatively increases, there is a possibility that the minimum value D_MAX[i+1] is smaller than the minimum values of the reception signal strengths in an unstable radio wave environment (the minimum values on the right of MIN[15] in FIG. 10), and if the average ((D_MIN[i]+D_MIN[i+1])/2) is determined as the threshold WIth, a routing table 21 might be produced using Hello packets transmitted/received in the unstable radio wave environment. Therefore, as described above, the weighted average is introduced in order to detect only a reception signal strength in a stable radio wave environment and set a reception signal strength closer to the minimum value D_MIN[i] as the threshold WIth.

When the n maximum values D_MAX[i] to D_MAX[n] or the P maximum values D_MAX[1] to D_MAX[P] are arranged in ascending order, α is set to relatively larger values as the difference between the D_MIN[i+1] and D_MIN[i] (=D_MIN[i+1]−D_MIN[i]) relatively increases, and set to relatively smaller values as the difference (=D_MIN[i+1]−D_MIN[i]) relatively decreases.

The weighted average is introduced for the same reason as the above.

In the foregoing description, the threshold WIth is determined based on the average of the two minimum values D_MIN[i] and D_MIN[i+1](=(D_MIN[i]+D_MIN[i+1])/2) or the weighted average of the two minimum values D_MIN[i] and D_MIN[i+1] (see Expression (1)), but the invention is not limited to the arrangement and the threshold WIth may be determined to be included in the range defined as having the two minimum values D_MIN[i] and D_MIN[i+1] as end values.

Furthermore, in the foregoing description, the number of adjacent radio devices used to determine the threshold WIth with higher reliability is five, but the invention is not limited to the arrangement, and the number of adjacent radio devices used to determine the threshold WIth with higher reliability may be other than five and determined depending on surrounding radio wave environments.

Note that according to the invention, the signal strength measuring module 241 and the threshold determining module 242 form the "threshold determining means (unit)."

The table producing module 243 forms the "table producing means (unit)."

The signal strength measuring module 241 forms the "signal strength detecting means (unit)."

The threshold determining module 242 that rearranges the n pairs of maximum and minimum values MAX[1] and MIN[1] to MAX[n] and MIN[n] into the n pairs of maximum and minimum values D_MAX[1] and D_MIN[1] to D_MAX[n] and D_MIN[n] or the P pairs of maximum and minimum values MAX[1] and MIN[1] to MAX[P] and MIN[P] into the P pairs of maximum and minimum values D_MAX[1] and D_MIN[1] to D_MAX[P] and D_MIN[P] forms the "rearranging means (unit)."

The threshold determining module 242 that determines the threshold WIth based on the n pairs of maximum and minimum values D_MAX[1] and D_MIN[1] to D_MAX[n] and D_MIN[n] or the P pairs of maximum and minimum values D_MAX[1] and D_MIN[1] to D_MAX[P] and D_MIN[P] forms the "setting means (unit)."

The table producing module 243 that maintains/stores in the routing table 21 the routing information without introducing the threshold forms the "route maintaining means (unit)".

The flag formed of "1" forms the "emergency flag", and the table producing module 243 that transmits the Hello packet HLP1 including the emergency flag forms the "transmitting means (unit)".

The IP module 20 that carries out radio communication between a source and a destination excluding the route in which the flag 1 is stored forms the "selecting means (unit)".

It is to be understood that the embodiments disclosed herein are illustrative and not restrictive. The scope of the invention is defined by the appended claims rather than by the description preceding them, and all modifications that fall within the scope of claims and equivalence thereof are intended to be embraced by the claims.

What is claimed is:

1. A radio device for use in an autonomously established radio network by which radio communication is carried out between a source and a destination, the radio device comprising:

a threshold determining unit for determining a threshold used to detect a strength equal to or more than the minimum strength of radio waves transmitted and received in a stable radio wave environment, based on a plurality of radio waves received from n radio devices, said n being a positive integer;

a table producing unit for producing a routing table that shows routing information between said source and said destination based on routing information of routes having a reception signal strength equal to or more than said determined threshold; and a route maintaining unit for determining whether strengths of radio waves are in a state of imbalance in a radio communication space between said radio device and said n radio devices based on said strengths of radio waves and the number of radio devices adjacent to the radio device, and for maintaining said routing information stored in said routing table or storing said routing information in said routing table without introducing the threshold determined by said threshold determining unit if the strengths of radio waves are in the state of imbalance, wherein said threshold determining unit includes:

a signal strength detecting unit for carrying out signal strength detection processing to detect a first set of m pairs of signal strengths including m maximum reception signal strengths and m minimum reception signal strengths corresponding to said m maximum reception signal strengths, based on said plurality of received radio waves, said m being an integer equal to or more than a prescribed number;

a rearranging unit for carrying out rearranging processing to rearrange said detected first set of m pairs of signal strengths so that said m maximum reception signal strengths are in descending or ascending order, thereby producing a second set of m pairs of signal strengths; and a setting unit for detecting two minimum reception signal strengths corresponding to two adjacent maximum reception signal strengths having the largest difference among the m maximum reception signal strengths in said second set of m pairs of signal strengths and setting said threshold in the range defined as having the detected two minimum reception signal strengths as end values.

2. The radio device according to claim 1, wherein said route maintaining unit maintains the routing information stored in said routing table without introducing said threshold if the number of radio devices adjacent to said radio device when said threshold has been introduced is less than a standard value.

3. The radio device according to claim 1, wherein said route maintaining unit unconditionally maintains the routing information stored in said routing table if the number of radio devices included in an adjacent radio device list received from any of said n radio devices is less than a standard value.

4. The radio device according to claim 1, wherein said route maintaining unit maintains the routing information stored in said routing table without introducing said threshold if the reception signal strength is lower than said threshold and if the packet error rate is lower than the threshold.

5. The radio device according to claim 1, wherein said route maintaining unit unconditionally stores in said routing table the routing information of a route passing through a radio device adjacent to said radio device if the number of radio devices stored in a first adjacent radio device list of said radio device but not in a second adjacent radio device list received from the adjacent radio device is equal to or more than a standard value.

6. The radio device according to claim 5, wherein said standard value is determined in accordance with the number of said n radio devices.

7. The radio device according to claim 2, wherein said route maintaining unit further comprises a transmitting unit for transmitting a packet including an urgent flag indicating that said threshold is not determined if said routing information is maintained or stored without introducing said threshold.

8. The radio device according to claim 7, wherein said route maintaining unit maintains or stores in said routing table the routing information of a route passing through a radio device which transmitted the packet including said urgent flag upon receiving the packet including said urgent flag from another radio device.

9. The radio device according to claim 1, further comprising a selecting unit for excluding a radio device from relay radio devices, the routing information of the radio device being maintained or stored without introducing said threshold.

10. The radio device according to claim 1, wherein said threshold determining unit redetermines said threshold if topology of said radio network is changed.

* * * * *